(12) United States Patent
Cappelli et al.

(10) Patent No.: US 6,264,779 B1
(45) Date of Patent: Jul. 24, 2001

(54) PRECURRED TIRE TREAD FOR A TRUCK TIRE AND THE METHOD OF ASSEMBLY

(75) Inventors: Mathew Ray Cappelli, Canal Fulton; Thomas Andrew Laurich, Tallmadge; William Allen Rex, Doylestown; Frederick Forbes Vannan, Jr., Clinton, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/179,478

(22) Filed: Oct. 27, 1998

Related U.S. Application Data

(63) Continuation-in-part of application No. 08/978,122, filed on Nov. 25, 1997, now Pat. No. 5,827,380, which is a continuation of application No. 08/642,290, filed on May 3, 1996, now abandoned, which is a division of application No. 08/497,709, filed on Jun. 30, 1995, now Pat. No. 5,536,348, and a continuation-in-part of application No. PCT/US98/10396, filed on May 22, 1998.

(51) Int. Cl.$^7$ .................................................. B29D 30/06

(52) U.S. Cl. ...................... 156/123; 152/209.6; 156/129; 156/130; 264/502

(58) Field of Search ..................................... 152/188, 185, 152/185.1, 209.6; 156/123, 128.6, 129, 96, 126, 130, 130.5, 421.2; 264/502, 326

(56) References Cited

U.S. PATENT DOCUMENTS

| | | | |
|---|---|---|---|
| D. 124,203 | 12/1940 | Rideout | D12/152 |
| 1,628,790 | * 5/1927 | Kostock | 152/188 |
| 2,297,354 | * 9/1942 | Hawkinson | 156/96 |
| 3,224,481 | 12/1965 | Lugli | 152/176 |
| 3,240,249 | 3/1966 | Lugli | 152/176 |
| 3,326,261 | 6/1967 | Young | 152/176 |
| 3,496,981 | 2/1970 | Barassi et al. | 152/187 |
| 3,778,203 | 12/1973 | MacMillan | 425/20 |
| 3,867,973 | 2/1975 | Cozzolino et al. | 152/153 |
| 3,868,284 | 2/1975 | Hogan, Sr. et al. | 156/96 |
| 4,053,265 | 10/1977 | Wulker et al. | 425/20 |

(List continued on next page.)

FOREIGN PATENT DOCUMENTS

| | | | |
|---|---|---|---|
| 2821892 | 12/1978 | (DE) . | |
| 0464660 | 1/1992 | (EP) | 156/129 |
| 2192907 | 7/1973 | (FR) . | |
| 72865 | 2/1953 | (NL) | 152/209 R |
| WO8904248 | 5/1989 | (WO) . | |

OTHER PUBLICATIONS

English Abstract for JP20729101, Mar. 1990.
English Abstract for JP 2179731, Jul. 1990.
English Abstract for JP 3132340, Jun. 1991.

*Primary Examiner*—Geoffrey L. Knable
(74) *Attorney, Agent, or Firm*—David L King

(57) ABSTRACT

An improved tire 200 having precured tire tread 10 for mounting to an unvulcanized or a vulcanized tire casing 100 is disclosed. The improved precured tread 10 has a pair of circumferentially continuous projections 60. One projection 60 extends axially outwardly from each of the lateral surfaces 40,50 of the tread. The rejection 60 provides a means for air tightly sealing the tread casing assembly at the lateral surfaces 40, 50 during the vulcanization of the tread 10 to the casing 100. The method of assembly includes placing the tread 10 and casing 100 in a smooth mold, closing the mold inflating a bladder expanding the casing 100 into the tread 10, the tread 10 correspondingly expands effecting an air tight sealing of the tread 10 and the mold at the annular projections 60 of the tread 10, applying heat and pressure causing a uniform flow of unvulcanized material radially outwardly along the tread edges. This invention provides uniform pressure distribution on the tire casing during curing. In this way belt package distortion is greatly minimized or eliminated. In another embodiment, a precured inner liner eliminates the need for an inflatable bladder.

2 Claims, 19 Drawing Sheets

U.S. PATENT DOCUMENTS

| | | | |
|---|---|---|---|
| 4,088,521 | 5/1978 | Neal | 156/96 |
| 4,098,936 | 7/1978 | Rawls | 428/40 |
| 4,111,676 | 9/1978 | Mechling et al. | 65/114 |
| 4,152,186 | 5/1979 | Shibata | 152/523 |
| 4,174,239 | 11/1979 | Symmes | 156/96 |
| 4,202,717 | 5/1980 | Seiberling | 152/540 |
| 4,230,511 | 10/1980 | Olsen | 156/123 R |
| 4,626,300 | 12/1986 | Barefoot | 156/96 |
| 5,176,764 | 1/1993 | Abbott et al. | 152/158 |
| 5,313,745 | 5/1994 | Mace, Jr. et al. | 51/326 |
| 5,536,348 | 7/1996 | Chlebina et al. | 156/129 |

\* cited by examiner

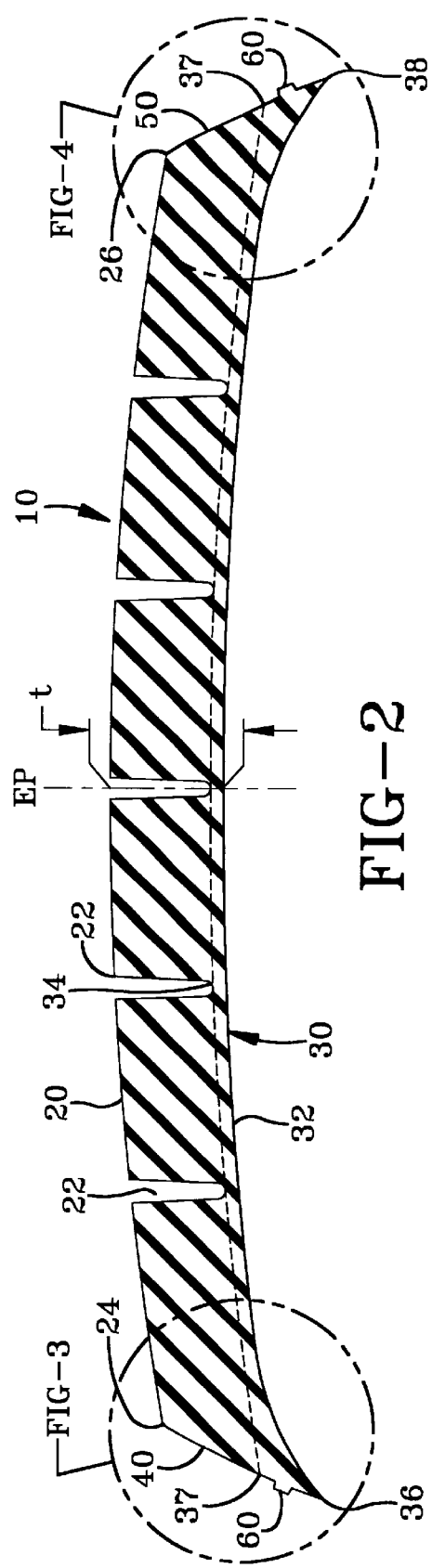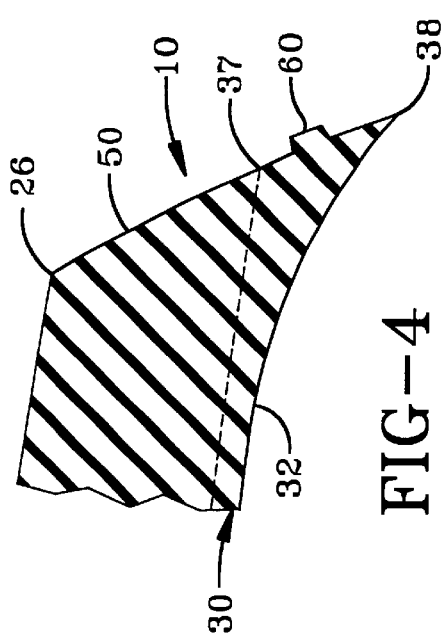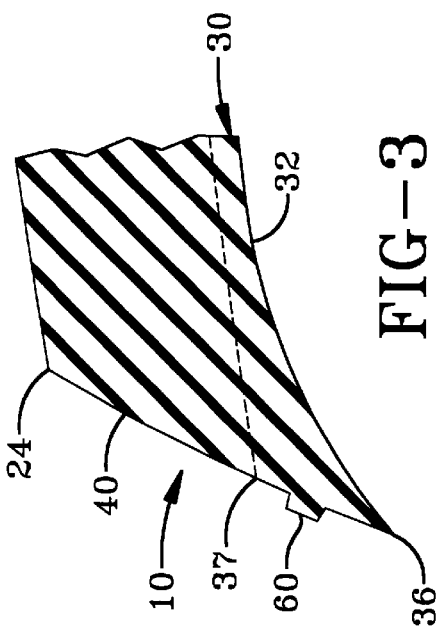

PRECURRED TIRE TREAD FOR A TRUCK TIRE AND THE METHOD OF ASSEMBLY

This is a continuation-in-part patent application claiming priority based on co-pending patent application Ser. No. 08/978,122, filed Nov. 25, 1997, now U.S. Pat. No. 5,827,380, which is a file wrapper continuation of Ser. No. 08/642,290, filed May 3, 1996, now abandoned which is a divisional application claiming priority on application Ser. No. 08/497,709, filed Jun. 30, 1995, now U.S. Pat. No. 5,536,348 and a continuation-in-part patent application claiming priority based on co-pending international application serial No. PCT/US 98/10396 filed May 22, 1998.

FIELD OF INVENTION

The invention relates to a tire having an improved precured tire tread for mounting to an unvulcanized or a vulcanized tire casing.

BACKGROUND OF THE INVENTION

Historically the use of precured treads was limited to retreaded tires exclusively. Tire casings are designed to survive several times longer than the tread. This is particularly true of truck tires and low aspect ratio passenger tires.

The Goodyear Tire & Rubber Company in the late 1980's introduced the Unicircle precured injection molded tread. This precured tread is disclosed in European Patent Publication 0-464-660A1. This annular or acutely shaped tread had short annular wings radially inwardly extending. The wings were flexible and adapted to accommodate casings of various axial widths. This tread introduced high-pressure injection molded rubber compounds having excellent wear and rolling resistance properties. Materials used in tread rubber compounds have also been improved making it feasible to transfer compression mold high quality treads for tires which can also achieve excellent wear and performance characteristics.

Later development efforts were concentrated on improved adhesion of the tread to the casing and in particular at better ways of adhering the wing edge to the casing. On May 24, 1994, U.S. Pat. No. 5,313,745 issued to Carl L. Mace, Jr., et al. relating to a tread edge grinning method which effectively created a chamfered edge enabling the cushion gum rubber to migrate over the chamfer effectively locking the annular wing of the precured tread to the cushion gum and the casing.

The advancement in the overall adhesion properties of the tread to casing bond coupled with the ability to meet or surpass the performance of conventional molded new tires means that it is now feasible for new tires to be made using precured treads. One aspect of the present invention describes an improved precured tread and a method for assembling it to a previously unvulcanized casing. A second aspect of the invention teaches how the tread can be applied to a precured new casing or a used prepared vulcanized casing. In each case, the invention permits the adhesion of the tread at the sidewall to exceed that achieved in the Mace patent while at the same time creating an almost imperceptible seam line between the casing and the tread.

A common concern in the tire art relates to the uniformity of tire construction and therefor tire performance. The inventors believe that once cause of poor and inconsistent tire performance relates to the non-uniform pressure distribution exerted on tire casings during the tire curing process. In particular, the inventors believe that belts can be distorted due to the non-uniform pressure exerted by the mold in the tread groove area. The present invention overcomes this problem by providing uniform pressure distribution on the casing during curing. Thus, tire life and performance is enhanced.

SUMMARY OF THE INVENTION

A tire 200 having an improved precured tire tread 10 for mounting to an unvulcanized or a vulcanized-precured tire casing 100,150 is disclosed. The tread 10 is made from an elastomeric material. The precured tire tread 10 has a radially outer ground engaging surface 20. The tread 10 has grooves 22 extending radially inwardly from the ground engaging surface 20. The tread material radially inwardly of the grooves 22 constitutes an inner tread 30, the inner tread 30 having a radially inner surface 32 and a radially outer surface 3. The tread 10 when in an annular configuration has a cross-section including first and second lateral surfaces 40,50 respectively extending radially inwardly and axially outwardly from an axially outermost point 24,26 on the ground engaging surface 20. The lateral surfaces 40,50 extend radially inwardly to axially outermost and radially innermost point of the inner tread surface, preferably extending a distance less than two times more preferably about equal to or slightly greater than the thickness of the tread 10, the tread thickness being measured at the equatorial plane (EP). The improved tread 10 has a pair of circumferentially continuous projections 60. One projection 60 extending axially outwardly from each of the lateral surfaces 40,50 and being radially outwardly space above the intersections 36,38 of the radially inner surface 32 of the inner tread 30 and the lateral surface 40,50. The projection 60 provides a means for air tight sealing the tread casing assembly at the lateral surfaces 40,50 during the vulcanization of the tread 10 to the casing 100. It is preferred that the projection 60 has a uniform cross-sectional shape that is either trapezoidal, semicircular or triangular and that projection be spaced radially about 3 mm preferably less than 15 mm outward of the intersection 36,38 of the radially inner surface 32 of the inner tread 30 and the lateral edge surface 40, 50.

The precured tread 10 is best molded to an unvulcanized casing 100 by the method of placing the tread 10 and casing 100 in a smooth mold 70 inserting an inflatable bladder 80 inside the casing 100 then closing the mold 70. The bladder 80 is then inflated expanding the casing 100 firmly into contact with the tread 10, the tread 10 correspondingly expanding firmly engaging the smooth mold 70 and air tightly sealing the tread 10 at the annular projections 60 along the tread edges 40,50. A strip or strips of cushion gum rubber 152 may be applied circumferential around the casing to facilitate bonding the tread to the casing. Additionally, an adhesive 153 can be employed if so desired. Heat and pressure is then applied causing a uniform flow of casing material radially outwardly along the tread edges 40,50 to the annular projection 60.

In the case of attaching a precured annular tread 10 of the present invention to a previously vulcanized casing 150 the method includes the steps of applying a cushion gum layer 152 and an adhesive cement 153 if needed to the prepared casing 150, expanding the tread 10 and positioning the tread 10 onto the casing, transferring the tread onto the casing 150, attaching two shoulder rings 201 to the assembly, the shoulder rings 201 firm and air tightly sealing the tread 10 at the projection 60 and then forming an annular cavity 202 between the projection 60 and the casing 150, placing the assembly into an autoclave or vulcanizing chamber and applying sufficient heat and pressure to cause a uniform flow of cushion gum material 152 radially outwardly along the tread edges to the annular projection 60. Preferably the annular rings 201 are provided with a means 204 for evacuating entrapped air from the cavity to insure the cushion gum rubber 152 can be adequately fill the cavity 202. Additionally, an adhesive cement coating 153 may optionally be applied to the tread 10 or the casing 150 or both to further enhance adhesion.

In the case of applying a precured strip tread 10 of the present invention the above step of expanding the tread 10 is replaced with the step of splicing the tread 10 all other steps being the same as the method of attaching a ring or annular tread as described above.

In another embodiment, a tire 300 has a precured tire tread 310 for mounting to an unvulcanized or a vulcanized-prepared tire casing 312, 314. The tread 310 is made from a an elastomeric material and has an inner tread surface 315, a radially outer ground engaging surface 318 and first and second tread edges 320, 322. The tread 310 may have tread grooves 324 and preferably one of the grooves 324 is centered on the ground engaging surface 318.

The tread 310 is molded to the unvulcanized tire casing 312 using a smooth mold 326 that has first and second annular radially extending projections 328, 330 and preferably a third annular radially extending projection 332 that is positioned substantially equidistant between the first and second annular radially extending projections 328, 330.

The precured tread 310 is best molded to the unvulcanized tire casing 312 by the method of placing the tread 310 and casing 312 into the smooth mold 326 and inserting an inflatable bladder 80 inside the casing 312 the closing the mold 326. The bladder 80 is then inflated thereby expanding the casing 312 firmly into contact with the tread 310. The tread 310 correspondingly expands and firmly engages the smooth mold 326 and air tightly seals the tread 310 at the first and second tread edges 320, 322 at the first and second annular radially extending projections 328, 330 respectively. Heat and pressure is then applied causing a uniform flow of casing material radially outwardly along the first and second tread edges 320, 322 to the first and second annular radially extending projections 328, 330.

The precured tread 310 is best molded to the vulcanized-prepared tire casing 314 by the method of adding a gum layer 334 to the outer surface 336 of the casing 314. The inner tread surface 316 of the tread 310 and the outer surface 336 of the casing 314 may be buffed prior to the adding of the gum layer 334. The inner tread surface 316 of the tread 310 is then placed onto the outer surface 336 of the casing 314. Next, first and second sealing rings 338, 340 having first and second annular radially extending projections 328, 330 are attached to the tread 310 and casing 314 such that the first and second annular radially extending projections 328, 330 are juxtaposed to the first and second tread edges 320, 322 respectively. Heat and pressure is then applied causing a uniform flow of the gum layer 334 radially outwardly along the first and second tread edges 320, 322 to the first and second annular radially extending projections 328, 330.

A common concern in the tire art relates to the uniformity of tire construction and correspondingly, tire performance. The inventors believe that once cause of poor and/or inconsistent tire performance relates to the non-uniform pressure distribution exerted on tire casings during the tire curing process. Evidence of this phenomena is found by comparing the performance of carved tires to molded tires. For many important performance parameters, the carved tire may perform better than the molded tire. The inventors believe that a major reason for this performance variation in the molded tire is related to the variation in pressure distribution exerted on the tire casing by the mold due to the various surface interfaces.

The applicant's have discovered a manufacturing advantage to forming and curing an inner liner 600 separate from other tire casing 100 components. This precured inner liner 600 forms a seamless, airtight protective layer for the tire casing 100. The precured inner liner 600 may be injection molded. A significant tire assembly advantage is provided by the precured inner liner 600 in that the use of an inflatable bladder 80 is made unnecessary. This greatly simplifies the method of molding a tire and therefore reduced the manufacturing equipment required. In short, the methods disclosed above can be achieved without the use of a bladder.

Definitions

"Axial" an "axially" means the lines or directions that are parallel to the axis of rotation of the tire.

"Buffed" means a procedure whereby the surface of an elastomeric tread or casing is roughened. The roughening removes oxidized material and permits better bonding.

"Casing" means the carcass, belt structure, beads, sidewalls, and all other components of the tire including layer of unvulcanized rubber to facilitate the assembly to the tread, the tread and undertread being excluded. The casing may be new, unvulcanized rubber or previously vulcanized rubber to be fitted with a new tread.

"Equatorial Plane (EP)" means the plane perpendicular to the tire's axis of rotation and passing through the center of its tread.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, that sustains the vehicle load. Precured component means a component at least partially vulcanized prior to assembly with other unvulcanized components.

"Radial" and "radially" means directions radially toward or away from the axis of rotation of the tire.

"Replacement tread" as used herein refers to a premolded and precured tread.

"Retreading " means the procedure of refurbishing a tread worn tire by removing the old tread and replacing it with a precured tread or a "hot capped" tread.

"Tread" means a molded rubber component which, when bonded to tire casing, includes that portion of the tire which comes into contact with the road when the tire is normally inflated and under normal load.

"Wing" means the radial inward extension of the tread located a axial extremes of the tread, the inner surface of the wing being an extension of the inner casing contacting surface of the tread.

Still other benefits and advantages of the invention will become apparent to those skilled in the art to which it pertains upon a reading and understanding of the following detailed specification.

BRIEF DESCRIPTION OF THE DRAWINGS

FIG. 2 is a cross-sectional view of the tread taken along line 2—2 of FIG. 1.

FIG. 3 is a enlarged partial cross-sectional view of the first lateral edge surface taken from FIG. 2.

FIG. 4 is a enlarged partial cross-section view of the second lateral edge surface taken from FIG. 2.

DESCRIPTION OF THE PREFERRED EMBODIMENT

Figure 1:
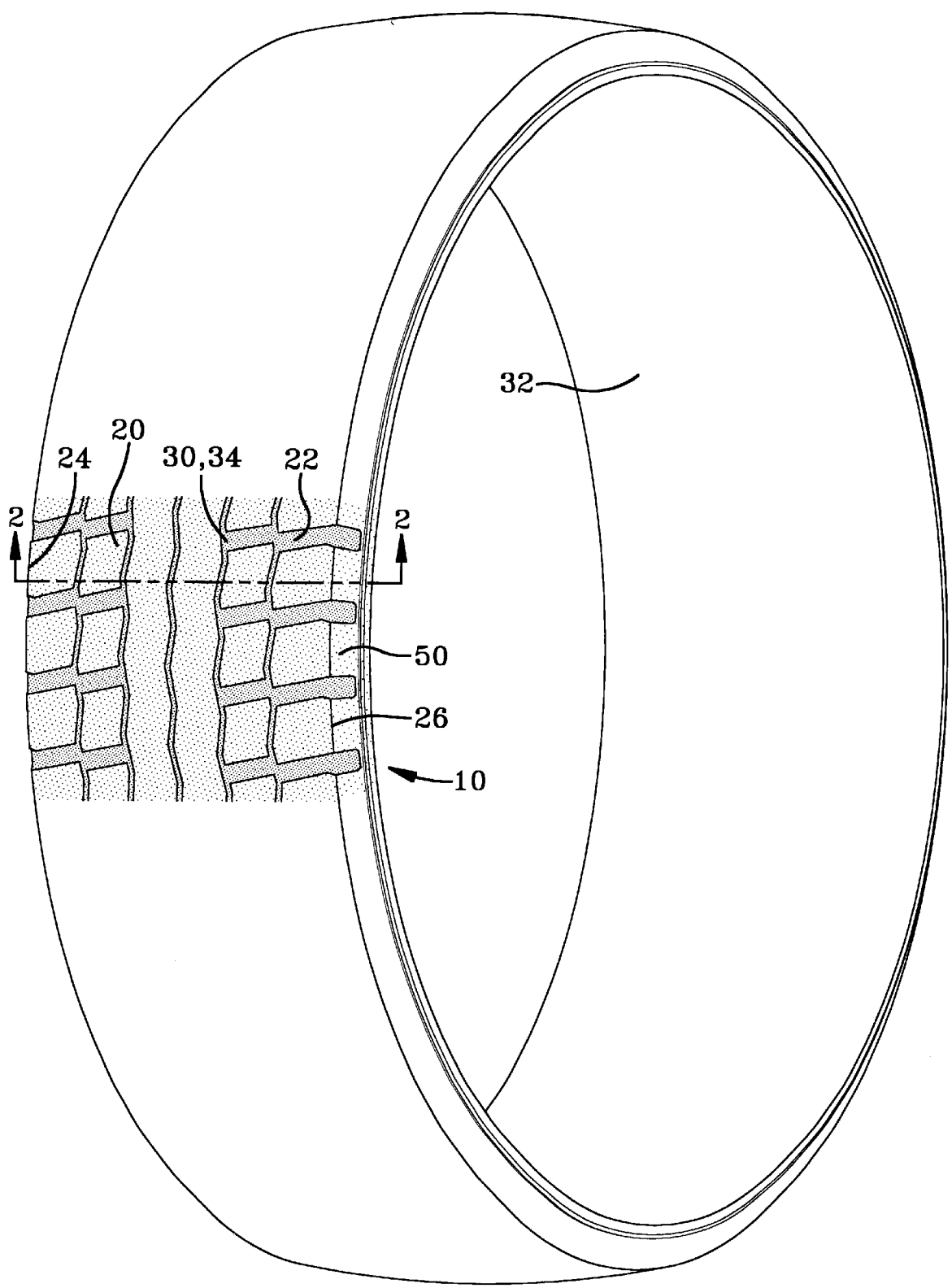
FIG. 1 is a perspective view of the tread according to the present invention in annular form.

With reference to FIG. 1, a perspective view of the tread 10 according to the preferred embodiment of the invention is illustrated. The tread 10 can be compressing or injection molded. The tread 10 as shown was manufactured in a spliceless annular ring. Alternatively, the tread 10 can be molded as a flat strip or accurately formed and when assembled to a casing may have a splice angle. The elastomeric precured tread 10, when annularly formed, has a radially outer ground engaging surface 20 with grooves 22 extending radially inwardly from the ground engaging surface 20 to an inner tread 30. The inner tread 30 commonly referred to as the undeterred has a radially inner surface 32 and a radially outer surface 34.

The tread 10 when in an annular configuration has a first and second lateral surface 40,50 respectively extending radially inwardly and axially outwardly from an axially outermost points 24,26 on the ground engaging surface 20.

Referring to FIGS. 2 and 3, this features relates to the annular wing portion of the tread as defined as the area between points 37 and 36,38 respectively. It is important to the tire and tread interface durability which lead to improved interfacial durability if tailored to the tire service condition, the tire materials and the tire carcass construction and shape. The material surfaces 40,50 extend radially inwardly from the axially outermost point 24,26 of the ground engaging surface 20 to the axially outermost and radially innermost point 36,38 respectively of the inner tread surface 32 a distance less than two times the thickness (t) of the tread and more preferably extend as little as one times the thickness (t) of the tread or just slightly greater than the tread thickness. The tread thickness (t) is measured at the equatorial plane (EP).

The tread 10 has a pair of circumferentially continuous projections 60. As shown in FIGS. 2, 3, and 4, one projection 60 extends axially outwardly from each of the lateral surfaces 40,50. The projections 60 as illustrated are spaced radially outwardly above the intersections 36,38 of the radially inner tread surface 32 and the lateral surface 40,50. As shown, the projection 60 has a trapezoidal cross-sectional shape. Alternatively, the projection 60 can have a uniform semi-circular, oval, square, rectangular, or triangular cross-sectional shape. The projection 60 provides a means for air tightly sealing the tread 10 and casing 100 assembly at the lateral surfaces 40,50 during the vulcanization of the tread 10 to the casing 100. The projection 60 is preferable radially spaced about 3 mm above the intersection 36,38 and preferably less than 15 mm above the intersection 36,38. In order to effect an air tight seal during molding it is important that the projection 60 is positioned radially below any lateral extending grooves 22 in order to effect a seal, therefore, the rejection 60 is preferably either radially aligned with or inward of the radially outer surface of the inner tread 32.

To further appreciate the novel features provided by the projection 60 attention is drawn to FIGS. 5 through 10 and the associated processes and methods used in practicing the invention.

Figure 5:
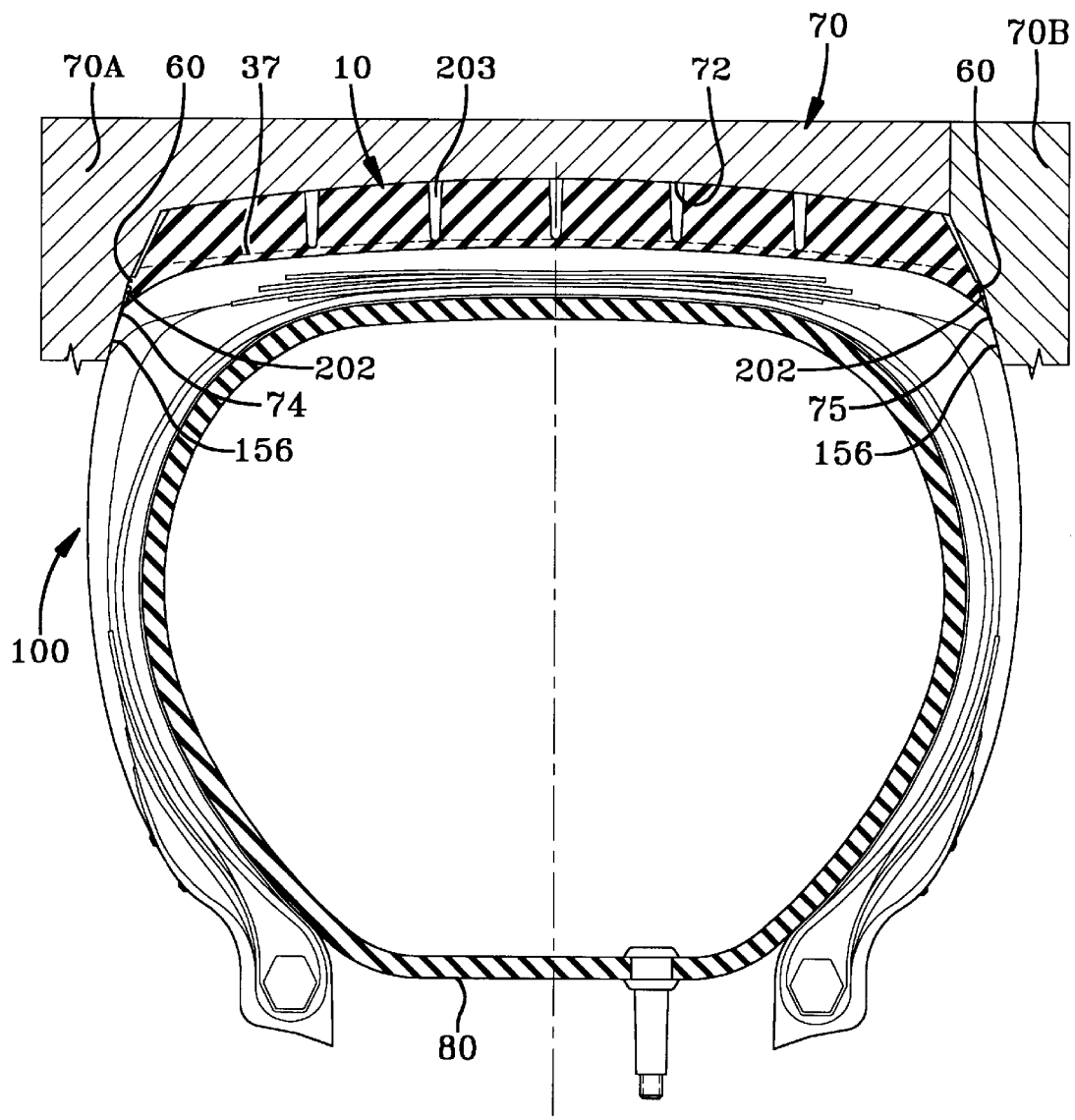
FIG. 5 is a cross-sectional view of the tread being molded to a new tire casing in a smooth mold, only the upper portion of the mold being illustrated for simplicity and clarity.
Figure 8:
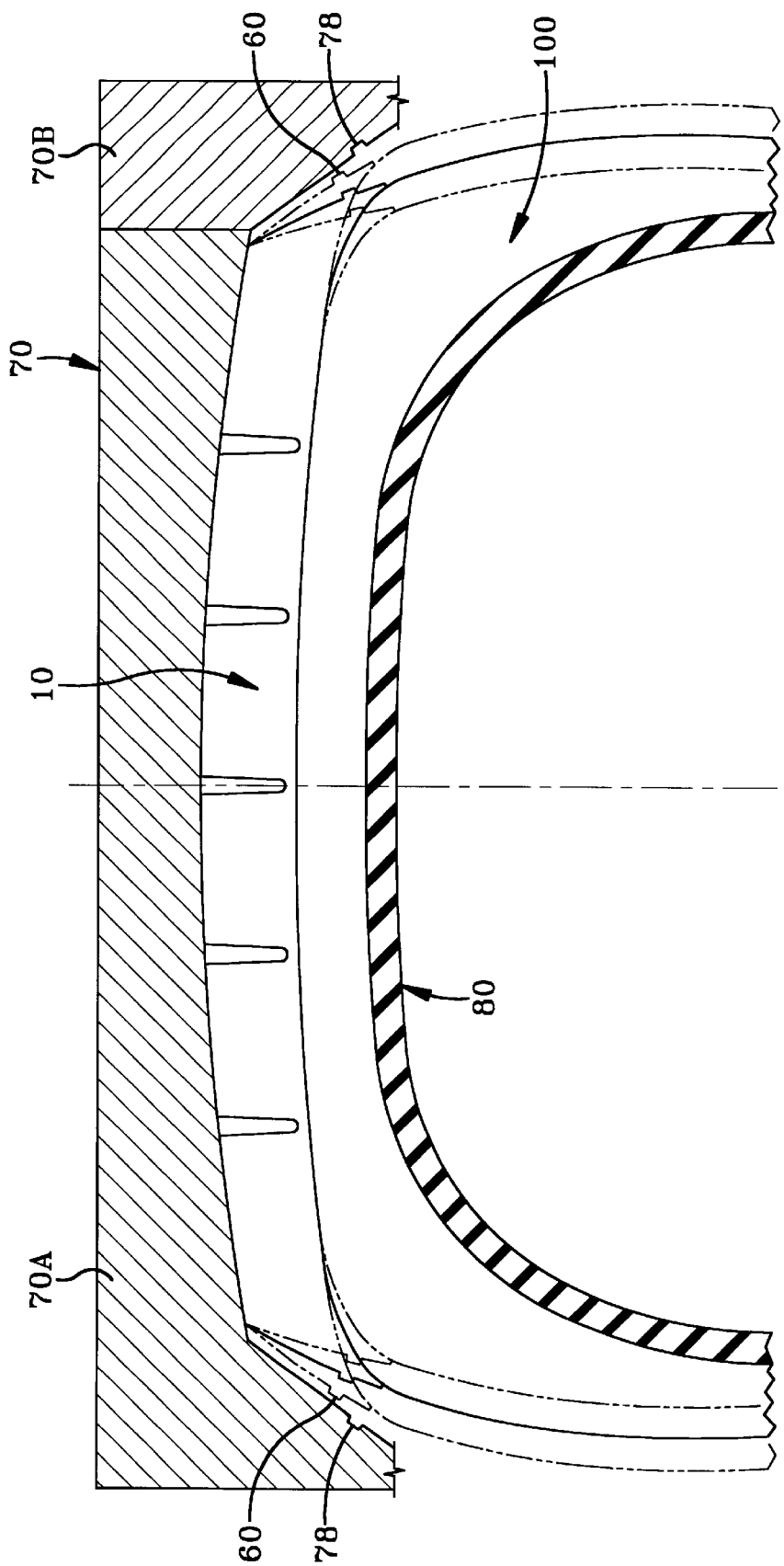
FIG. 8 is a cross-sectional view of a tread being firmly pressed into a smooth mold by the inflation of a bladder which expands the green or unvulcanized casing.

FIG. 5 is a cross-sectional view of a tread 10 attached to a "green" or unvulcanized casing 100 and placed into a smooth mold 70. The smooth mold 70 has no tread pattern. The mold can be split along the circumferential direction at the centerline or anywhere between the centerline and the axially outermost points 24,26 of the ground engaging surface 20 of the tread 10, preferably offset as shown, thus forming two parts 70A and 70B. This facilitates placing the tread and casing into the mold 70. To simplify the drawings, the lower sidewall and bead areas of the mold 70 are not illustrated. These features are functionally the same as is conventionally practiced in the art of tire molding and therefore are accordingly not shown to better facilitate the novel aspects of this molding process. One side of the mold 70B is removed and the casing 100 and the tread 10 can be inserted into the mold half 70A. Then, the mold portion 70B is clamped or otherwise attached to the mold half 70A. An inflatable bladder 80 is inserted into the casing 100 prior to closing the mold 70. The green casing 100 preferably has an outside diameter sufficiently small that the annual tread 10 can be easily positioned over the casing 100 without requiring any physical stretching or diametrical expansion of the tread 10. Alternatively, should the tread have a diameter smaller than the casing, for example, at the wing areas between location 37,36,38 respectively, then the tread may be expanded to permit the casing to be inserted inside the tread. Preferably the tread 10 is first positioned into the mold 70 and then the casing 100 and bladder an inflatable or an expandable core 80 are positioned into the mold 70. As shown in FIG. 8, when the mold 70 is closed, the bladder 80 is inflated or the core 80 expanded thereby expanding the casing 100 firmly into contact with the tread 10. As further shown in FIG. 5, the tread 10 correspondingly expands firmly engaging the radially inner surface 72 and the two lateral surfaces 74,75 of the smooth mold 70. At these mold lateral surfaces 74,75 the annular projections 60 press against the mold 70 making an air tight seal. The casing 100 at the shoulder area 156 also engages the mold thus creating a small cavity 202 for the rubber to flow into. This cavity 202 may be vented or evacuated to facilitate material flow as is discussed below.

Figure 9:
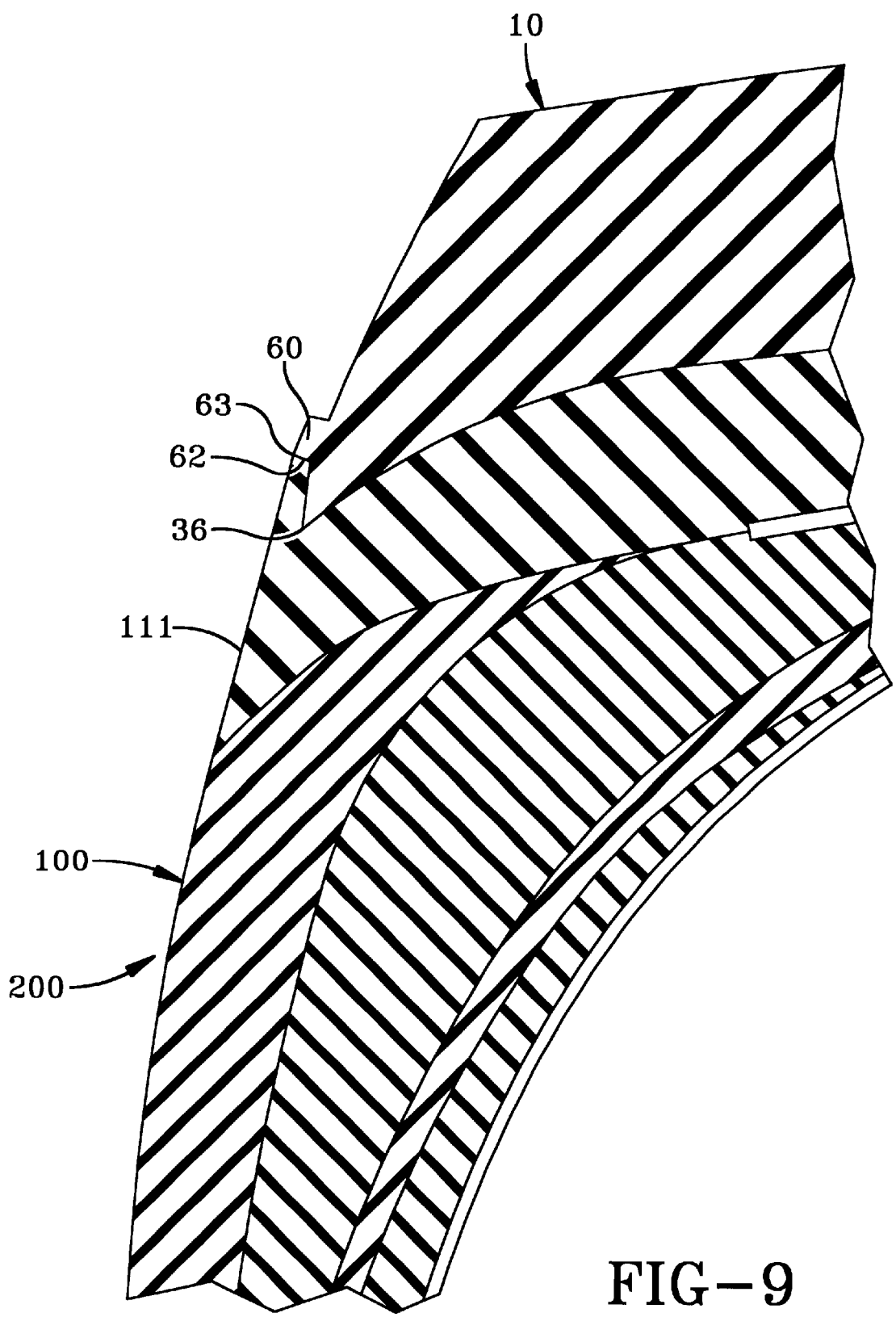
FIG. 9 is a partial cross-section view of the tread and casing after molding.
Figure 9A:
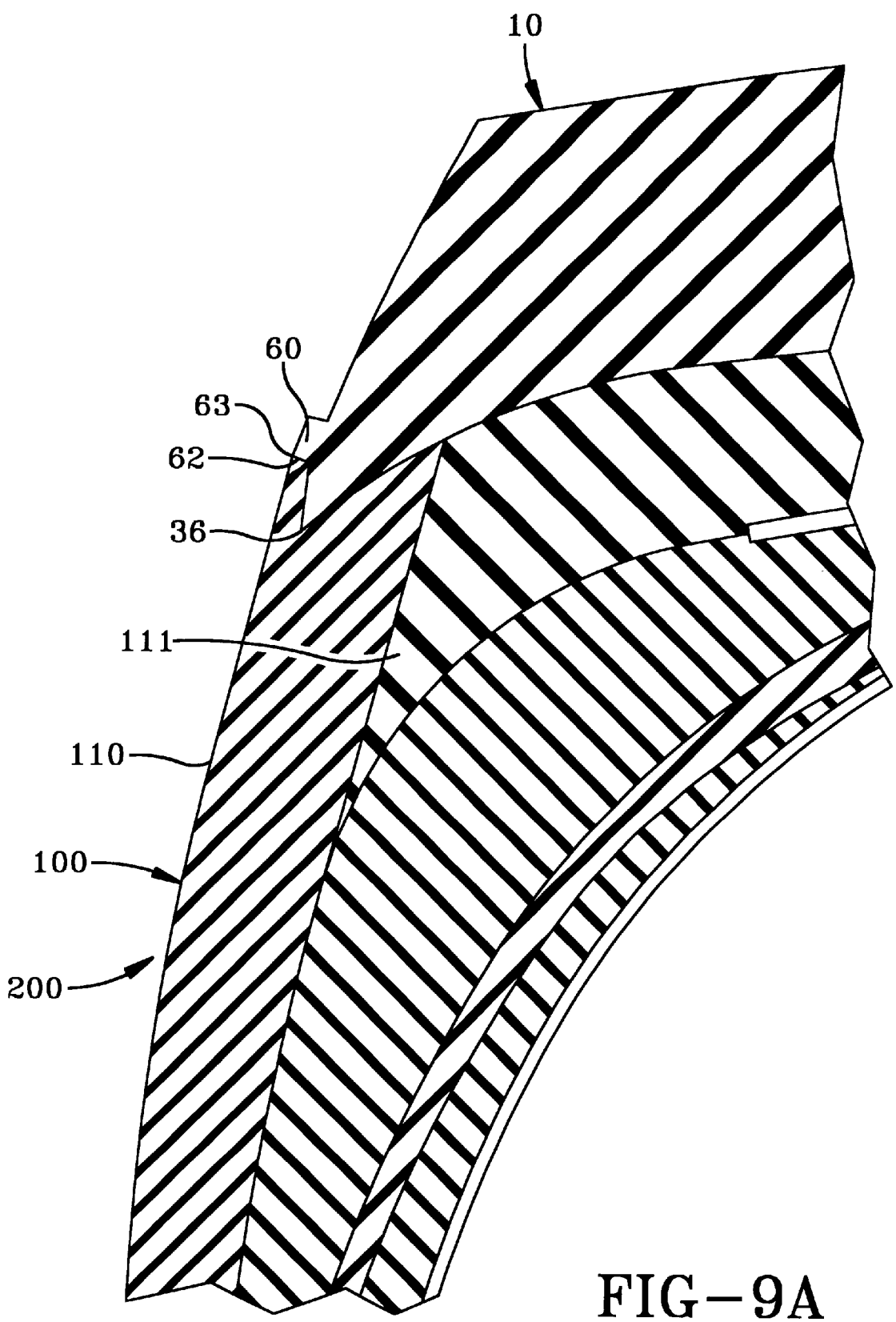
FIG. 9A is a similar view having an alternative casing construction.
Figure 10:
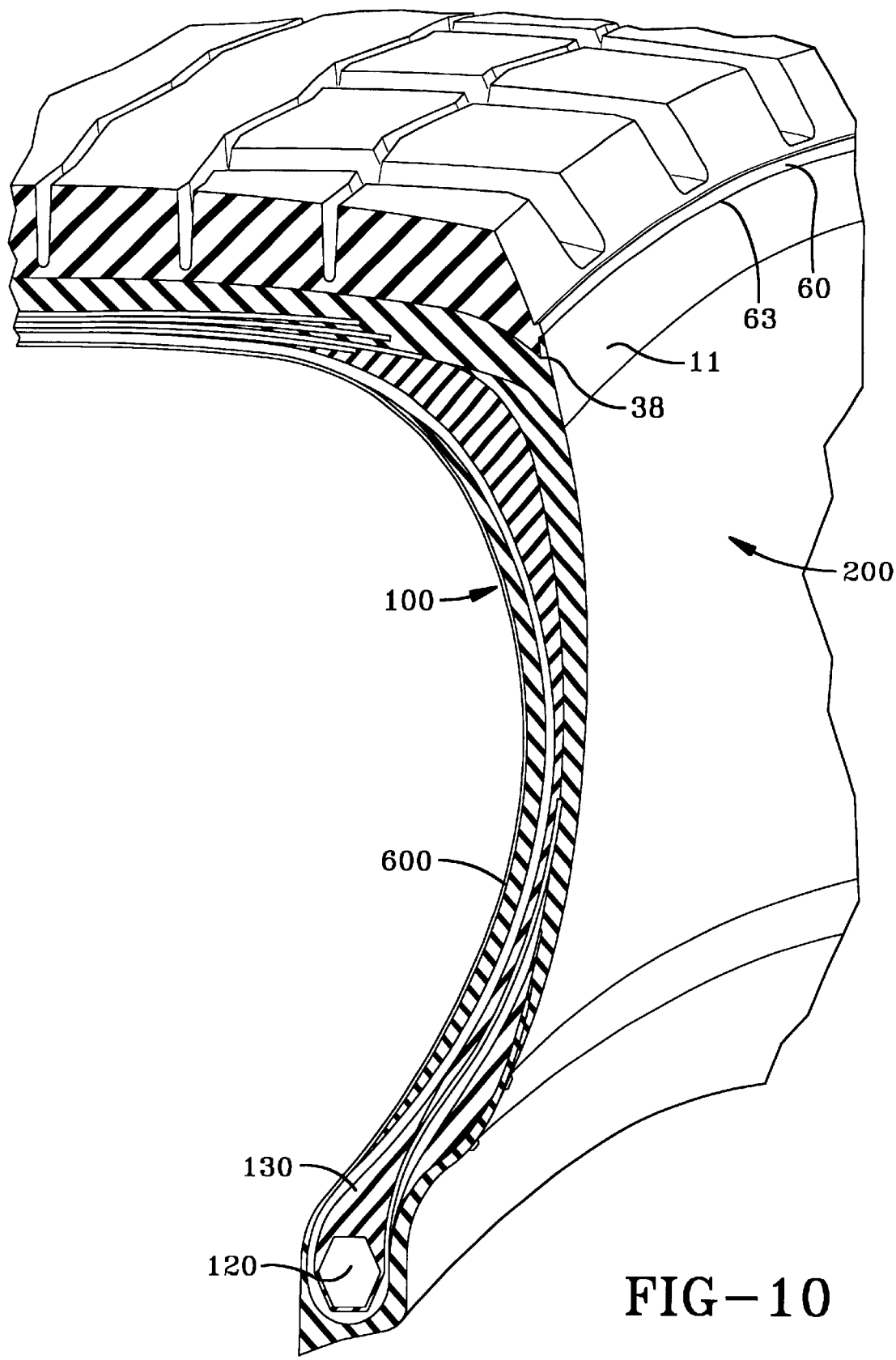
FIG. 10 is a enlarged partial perspective view of the cross-section of FIG. 8 depicting the tire 200 and the tread 10 to casing 100 interface.
Figure 10A:
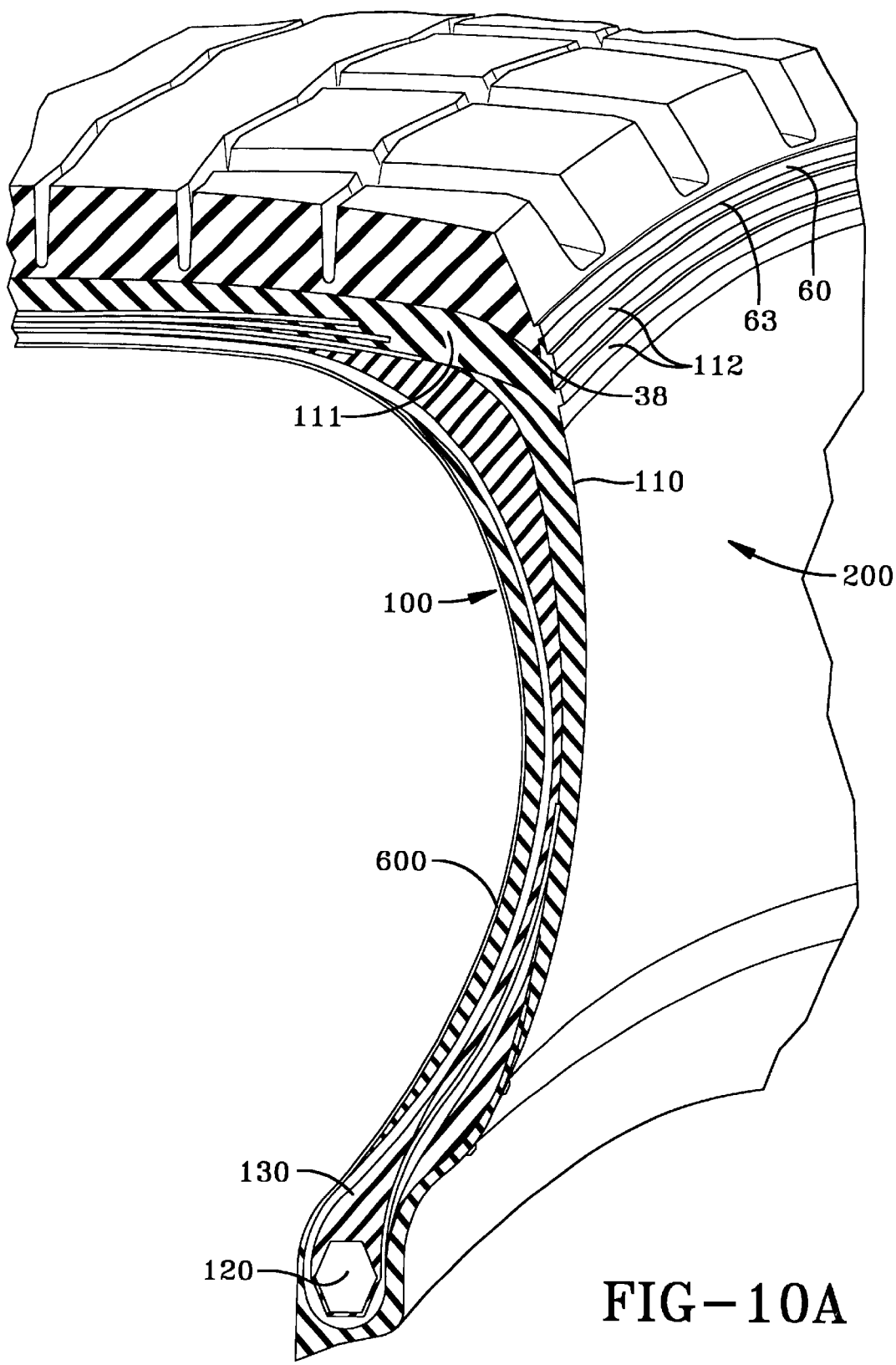
FIG. 10A is a second embodiment similarly shown as in FIG. 10 wherein the casing has the sidewall extended to the tread and further illustrates additional concentric rings.

Heat and pressure is then applied to the mold 70 in the same flashion as the conventional tire vulcanization process. As the green casing 100 heats to vulcanizing temperatures the casing material adjacent the tread edges 36,38 flows. This material flow is as illustrated in FIGS. 9,9A and 10,10A. In FIGS. 9 and 10 the casing 100 has the tread base 111 radially outward and over the sidewall 110. In FIGS. 9A and 10A the casing 100 has the sidewall 110 extending radially to the tread 10 with the base 111 interposed axially between the two sidewalls 110. The tread 10 is effectively encapsulated in the sidewall 110 or the base 111 of the casing 100. The material flow is such that the radially inner surface 62 of the projection 60 acts as a dam preventing rubber flow beyond the projection 60. The resultant tire 200 has an almost imperceptible seam line 63, camouflaged by the annular projection 60. In a preferred embodiment the smooth mold 70 has several concentric rings 78 in the tire shoulder area which upon molding the casing makes several additional concentric rings 112 further masking the joint or seam as further shown in FIGS. 8 and 10A.

Figure 6:
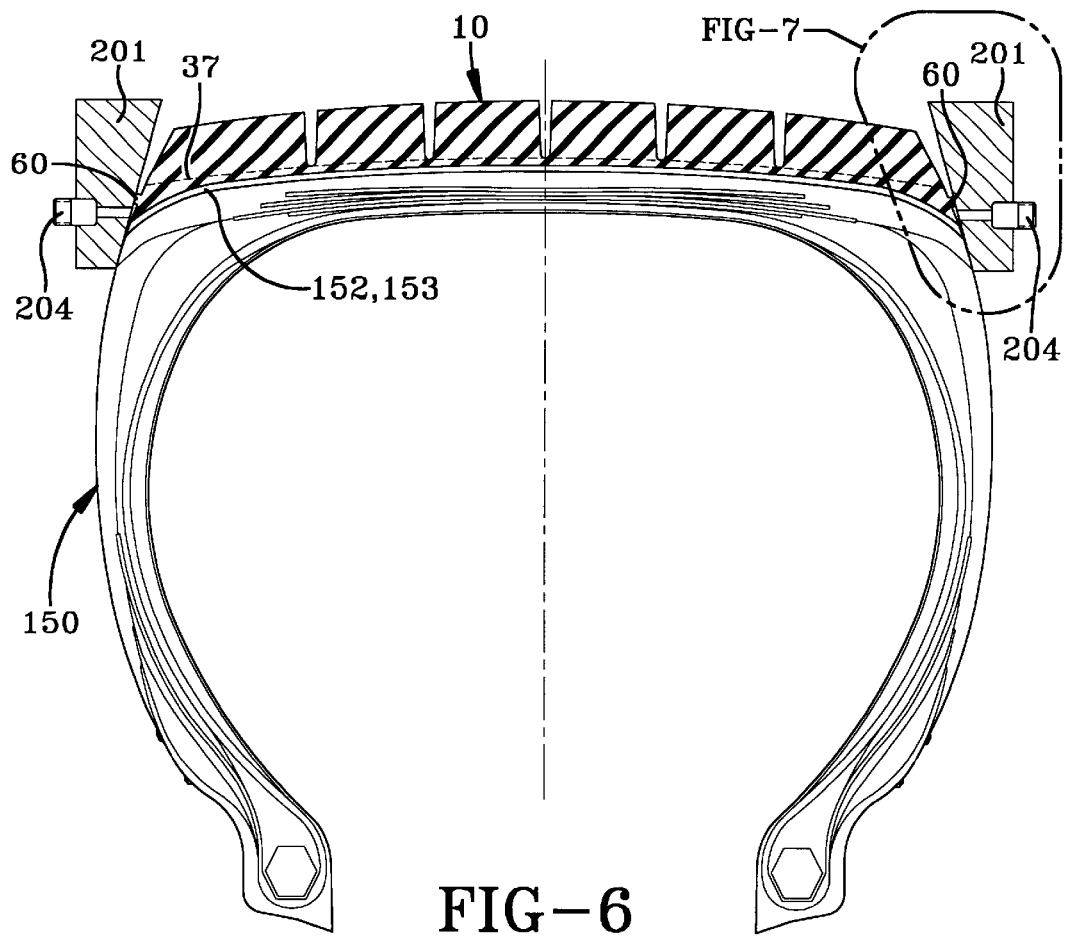
FIG. 6 is a cross-sectional view of the tread being molded to a new or used previously vulcanized tire casing by employing a pair of sealing rings.
Figure 7:
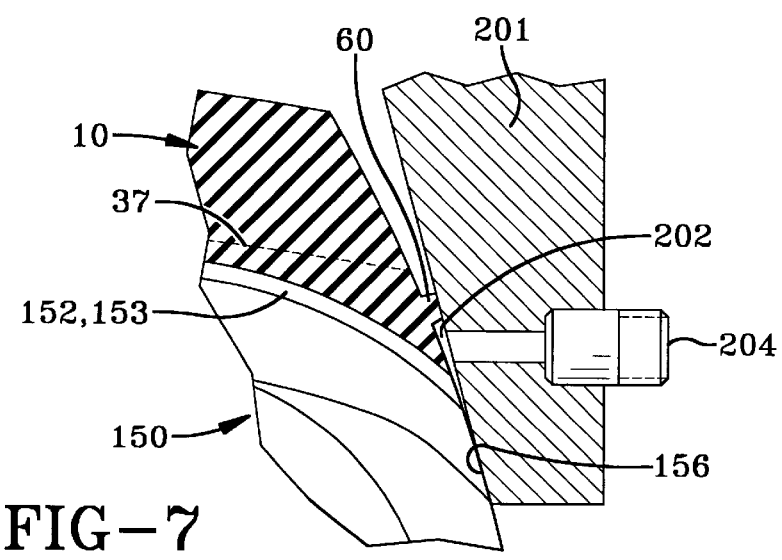
FIG. 7 is an enlarged partial view of the tread and casing taken from FIG. 6.

Referring to FIG. 6 applicants wish to focus the reader's attention to the use of the precured tire in combination with a new or previously used vulcanized casings. In the case of retreading or treading a previously vulcanized casing 150 the tread 10 must either be wrapped about the casing 150 if spliced or stretched expanding the treads inside diameter to fit onto the casing if a spliceless ring tread 10 is employed. Prior to attaching the tread 10 to the casing 150 is preferred that both the casing 150 and the tread 10 is buffed at the mating surfaces. An adhesive 153 and a cushion gum layer 152 is then applied to the casing 150. The cushion gum layer 152 is cut to a width slightly wider than the tread. A pair of sealing rings 201 are then attached to the tread casing assembly. Each sealing ring 201 firmly engages the continuous projection 60 and the casing shoulder 156 creating a small annular cavity 202 at the tread 10, cushion gum 152, casing 150 interface. The assembly is then placed in a vulcanizing chamber where heat and pressure is applied, softening the cushion gum layer sufficient to cause a flow of rubber into the cavity. Entrapped air in the cavity can be removed by means of evacuating the air via a vent port 204 in each ring 201, the vent port being connected to an air evacuation means (not illustrated). This same feature can be employed on the mold 70 previously discussed. Alternatively, each seal ring 201 can include an inflatable seal or bladder (not illustrated) which is deflated after the seal between the rings 201 an the tread 10 casing 150 assembly is effected. This approach likewise generates a vacuum sufficient to cause the gum rubber 152 to flow to the projection 60 thus permitting the almost imperceptible seam line to be formed as shown in FIGS. 9 and 10.

As an alternative method of molding the tread to the casing it will be appreciated by those of ordinary skill in the art that the annular projections 60 of the tread 10 could alternatively be located on the mold 70. In such a configuration, the mold 70 at each lateral surface 7 and 75 would include at least one annular projection similar to the cross-sectional shape of those shown on the tread 10. This alternative design would similarly form the cavity 202 which may be vented or evacuated to permit material flow as discussed above. The resultant flow would yield a molded ring of cushion gum or casing material to be formed around the precured tread 10 effectively locking the tread edge 36,38 to the casing 100 or 150.

A significant advantage of the process as disclosed is a dramatic reduction in cure time. The precured tread 10 needs no additional curing therefore the entire molding process only is required to vulcanized the casing 100. The casing 100 being relatively thin can rapidly be brought to vulcanizing temperatures cured and finished in about one-half the time required to cure a traditional tire having a green tread and casing. The precured tread 10 can be injection molded in less than three minutes. Alternatively, the tread can be precured using a slower compression molding process. The combination of precured tread 10 and a precured casing can be molded in a smooth mold in less than half the time required to conventional cure an unvulcanized tire. The rapid molding is achieved when the tread is maintained at temperatures of about 200° F. or above just prior to molding the finished tire. The same tire conventionally processed requires about 40 minutes to cure.

Figure 11A:
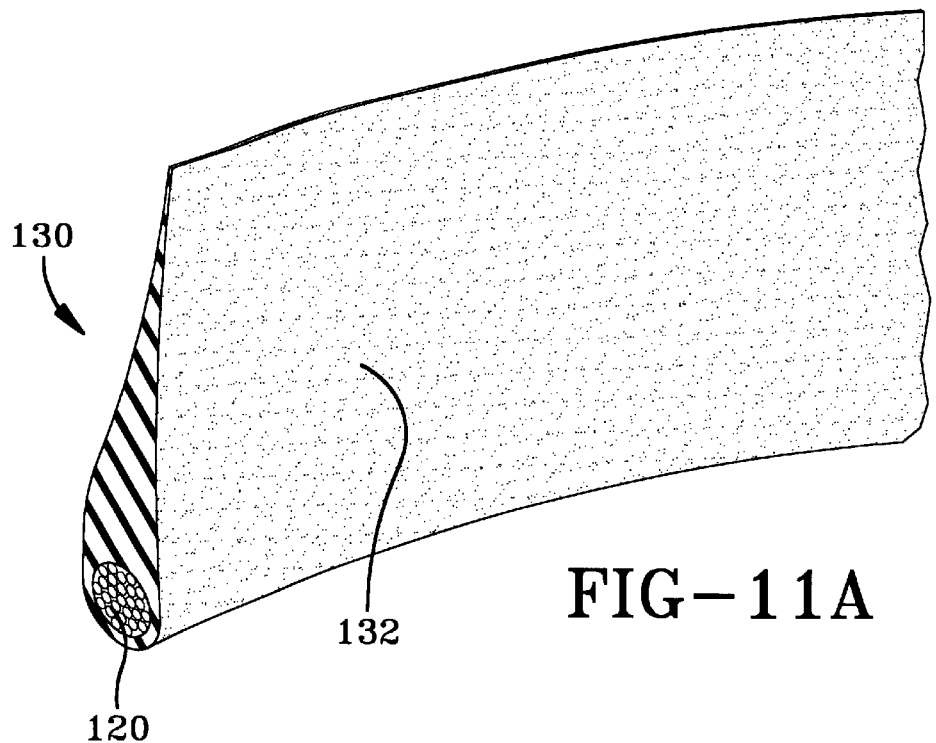
FIGS. 11A and 11B are partial perspective views of the textured precured apex.
Figure 11B:
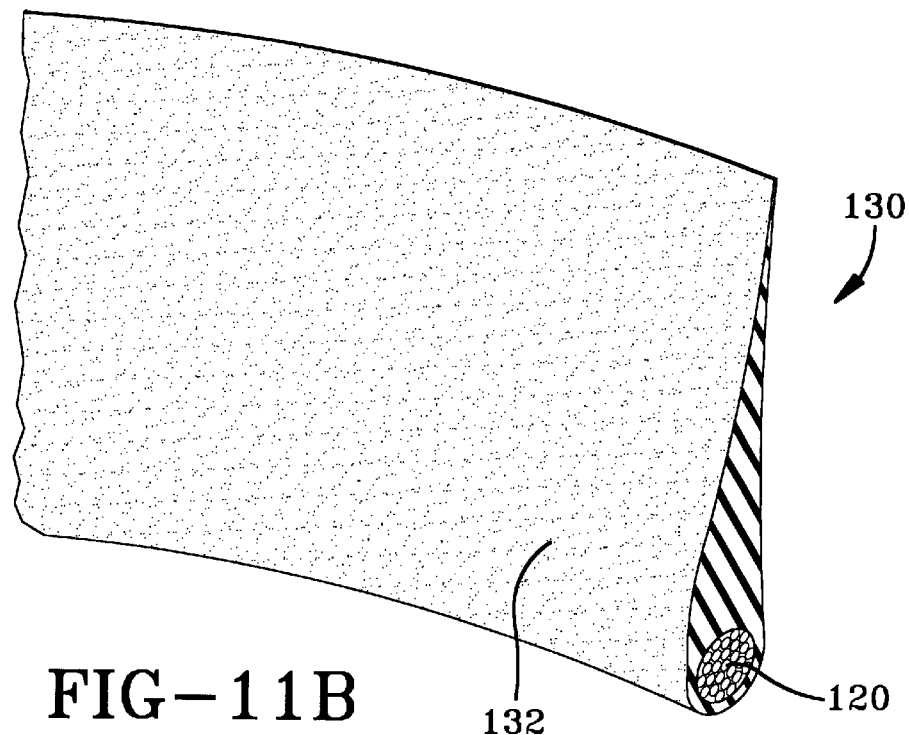

The inventors have found that the invention can best be practiced employing a primary green or otherwise unvulcanized casing 100 having a bead core 120 encapsulate in a precured annular apex 130. The bead core 120 and precured apex 130 subassembly are preferably manufactured using an injection molding process wherein the elastomeric apex 130 is injection molded simultaneously encapsulating the bead core 120. Alternatively, a compression molded apex bead assembly is also feasible. As shown in FIGS. 11A and 11B, the apex 130 may have finely roughened textured outer surfaces 132 which can enhance the adhesion surface area between the unvulcanized components of the casing and the precured apex 130 in some tire constructions. The combination of a precured tread 10 with a substantially unvulcanized casing 100, except for the precured apex and the bead subassembly 130, achieves excellent adhesion properties under rapid curing cycles. The heat transfer requirements of the tread-casing assembly are reduced by reducing the thickest portions of uncured rubber in the casing 100.

A second benefit to rapid manufacturing time is cost. By molding tires at 2 or 3 times the speed of conventional procedures means that only ½ or less molds and mold machines are needed to supply the tire production demand.

These costs can add up to millions of dollars in capital savings for production of new tires. The molding of the tread 10 prior to inserting the tread 10 and asing 100 into the mold 70 eliminates the distortion that are created when the conventional mold with a radially inwardly extending tread groove pattern is pressed against the slab of uncured tread rubber. This pushing of the mold tread face against the uncured tire causes the belts to distort and as the uncured rubber of the tread flows to form a grooved tread pattern, the distorted belts indiscriminately can effect the radial location of the grooves and the lugs. This results in a non-uniform tread base compound thickness. The tires 200 when manufactured with uncured casings 100 according to the present invention can be built to the cured dimension and shape of the precured tread 10. This eliminates the distortions commonly found in new conventionally molded tires thus greatly improving tire uniformity. The tread base often times is selected to provide reduced rolling resistance. Non-uniformities in thickness can adversely reduce the beneficial use of the base compound. When a conventionally molded tire is removed from the mold and mounted and inflated on a wheel, the belts conform under tension or stretch causing the lugs or tread elements to be radially high and low due to these non-uniformities in thickness. This high-low dimensional discrepancy can induce irregular wear problems. All of these detrimental conditions can be eliminated by the use of precured treads employed in smooth molds.

Another benefit of the sealing of the tread projections 60 against the mold faces 74,75 means that the air space 202 between the tread 10 and the mold 70 can be evacuated or pressurized during mold curing this can greatly enhance the uniformity of molded tire as well.

The method and apparatus for the new tire and retreaded tire yield the added benefit of having a retreaded tire that is virtually identical in appearance to the original new tire, both tires having the tread edge at the casing interface totally encapsulated in rubber, effectively locking this portion of the tread to the casing. New tires made according to the present invention have been tested with no evidence of tread edge separation.

Another significant advantage to this invention is that the dimensional accuracy of the precured components permits the overall tire component tolerance to be tightened. This enables the tire to be built to tighter tolerances using less material. These tighter tolerances naturally improve tire uniformity and overall tire performance.

Figure 12:
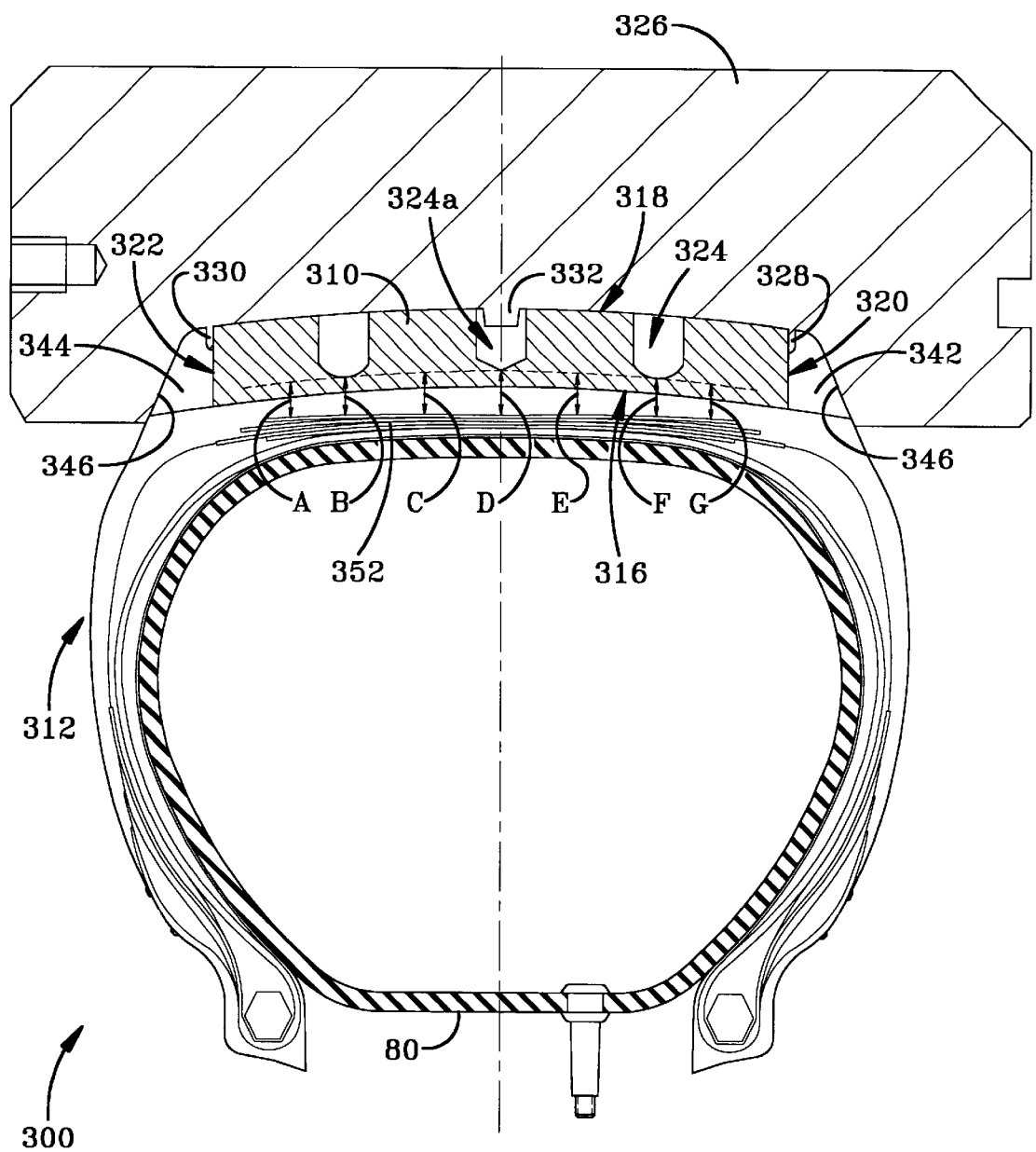
FIG. 12 is a cross-sectional view similar to FIG. 5 showing another embodiment having a tread being molded to a new tire casing in a smooth mold, only the upper portion of the mold being illustrated for simplicity and clarity.

With reference now to FIG. 12 another embodiment is shown. In this embodiment, a tire 300 has a precured tire tread 310 for mounting to an unvulcanized tire casing 312. The tread 310 is made from a an elastomeric material and has an inner tread surface 315, a radially outer ground engaging surface 318 and first and second tread edges 320, 322. As shown, the tread 310 has a substantially rectangular cross-section. For this reason the tread 310 is preferably in ring or strip form as commonly known in the art. Otherwise, the tread 310 can be formed as tread 10 discussed above. The tread 310 may have tread grooves 324 and preferably one of the grooves 324a, shown in FIG. 12, is centered on the ground engaging surface 318. The advantage of the center groove 324a will be discussed further below.

With continuing reference to FIG. 12, the tread 310 is molded to the unvulcanized tire casing 312 using a smooth mold 326. The smooth mold has first and second annular radially extending projections 328, 330 that are used to center the tread 310 to the mold 326. In particular, the first and second projections 328, 330 are preferably positioned laterally spaced equidistant to the distance between the first and second edges 320, 322 of the tread 310. The projections 328, 330 are used to form first and second annular cavities 342, 344 between the first and second tread edges 320, 322 and the inner surface 346 of the smooth mold 326. Preferably a third annular radially extending projection 332 is received within one of the tread grooves 32 for additional tread centering means. Most preferably, the third projection 332 is positioned substantially equidistant between the first and second annular radially extending projections 328, 330 and is therefore ideally positioned for use in being received within the center groove 324a of the tread 310.

Figure 13:
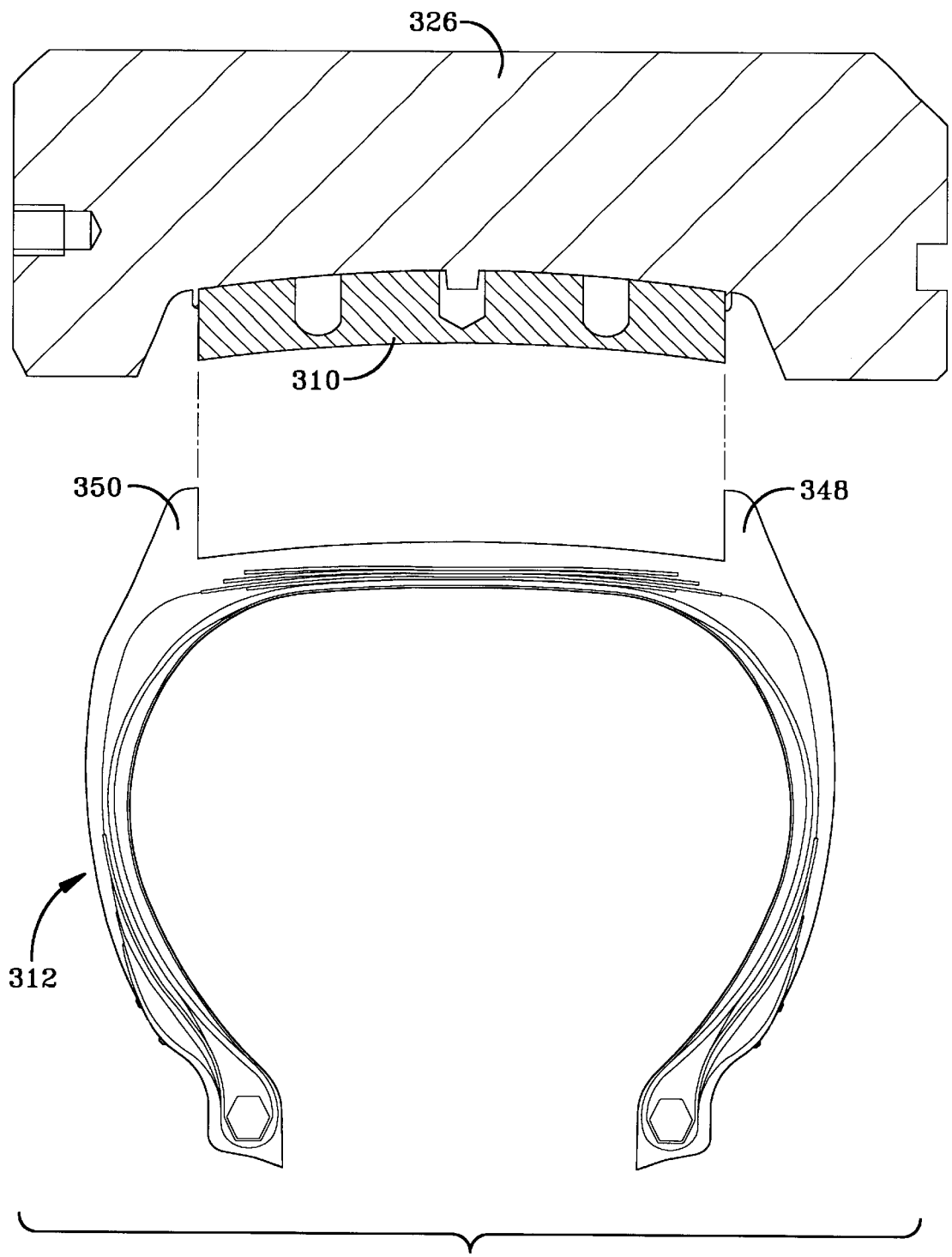
FIG. 13 is a cross-sectional view of the embodiment of FIG. 12 but with the tread shown separate from the casing and the casing having shoulder wings that mold to the tread.

With reference now to FIGS. 12 and 13, the precured tread 310 is best molded to the unvulcanized tire casing 312 by the method of placing the tread 310 into the mold 32 with the first and second edges 320, 322 fitting between the first and second projections 328, 330. Preferably, the third projection 332 is positioned within the center groove 324a of the tread 310. In this way the tread 310 is properly centered with respect to he mold 326. The casing 312 is also placed into the smooth mold 326 and an inflatable bladder 80 is inserted inside the casing 312. The mold 326 is then closed and the bladder 80 is inflated. This inflation expands the casing 312 firmly into contact with the tread 310. The tread 310 correspondingly expands and firmly engages the smooth mold 326 and air tightly seals the tread 310 at the first and second tread edges 320, 322 against the first and second annular radially extending projections 328, 330 respectively. Heat and pressure is then applied causing a uniform flow of casing material radially outwardly along the first and second tread edges 320, 322 to the first and second annular radially extending projections 328, 330. In other words, the first and second annular cavities 342, 344 are filled with the molten casing material and the first and second edges 320, 322 of the tread 310 are mashed or squeezed with the casing material. This forms a strong bond that is only barely visible. As best seen in FIG. 13, once cured, the casing material within the cavities 342, 344 forms first and second annular wings 348, 350. These wings 348, 350 help to secure the tread 310 to the casing 312.

Figure 14:
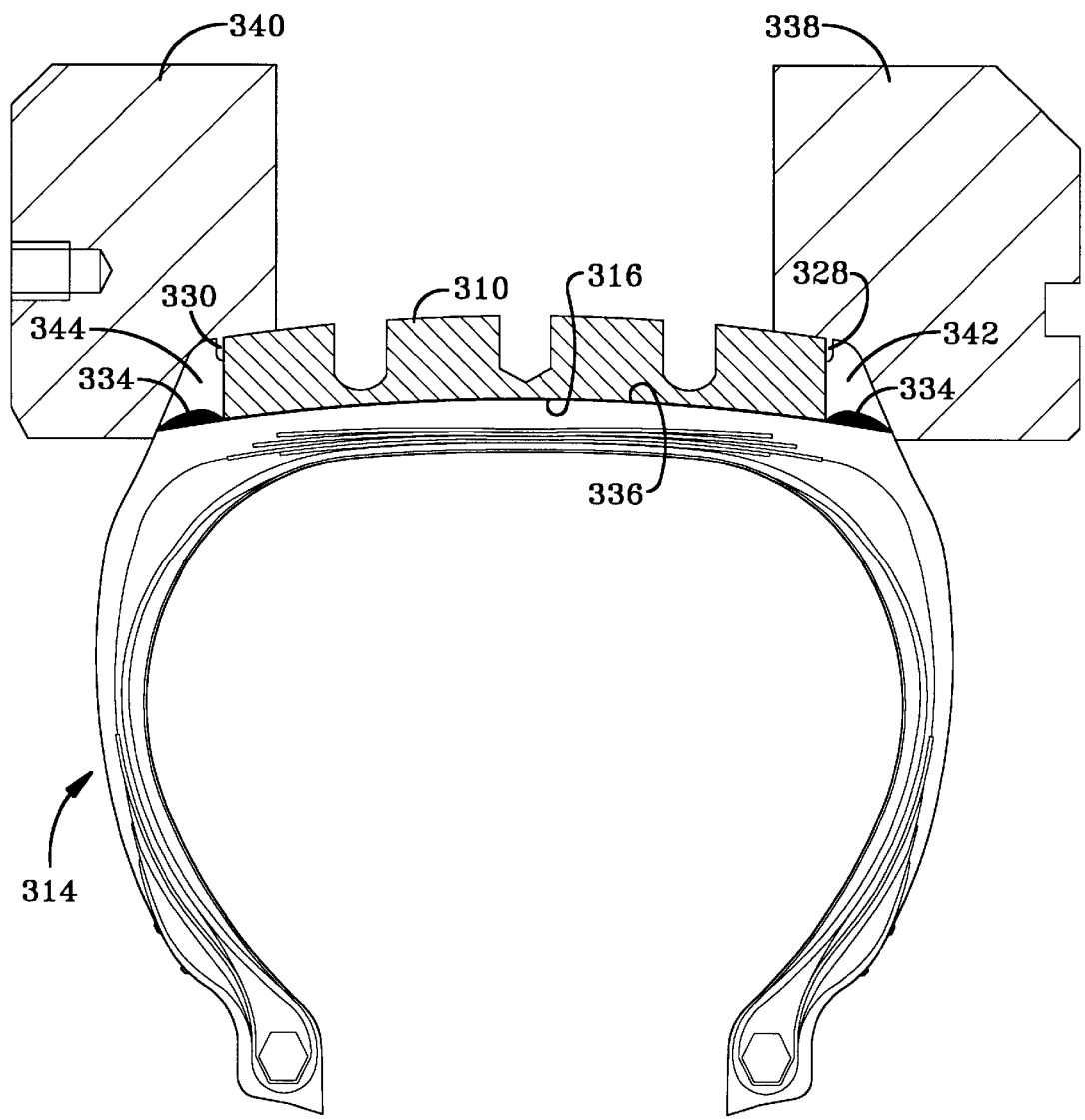
FIG. 14 is a cross-sectional view of the tread being molded to a new or used previously vulcanized tire casing by employing a pair of sealing rings.

With reference now to FIG. 14, in another embodiment the precured tread 310 is molded to the precured tire casing 314 using first and second sealing rings 338, 340. The sealing rings 338, 340 have first and second annular radially extending projections 328, 330 respectively similar to the smooth mold 326 discussed above. The precured tread 310 is molded to the vulcanized-prepared tire casing 314 by first adding a gum layer 334 to the outer surface 336 of the casing 314. Preferably, the outer edges of the gum layer 334 are thicker than the center portion as shown. The inner tread surface 316 of the tread 310 and the outer surface 336 of the casing 314 may be buffed prior to the adding of the gum layer 334. The inner tread surface 316 of the tread 310 is then placed onto the outer surface 336 of the casing 314. Next, the first and second sealing rings 338, 340 are attached to the tread 310 and casing 314 such that the first and second annular radially extending projections 328, 330 are juxtaposed to the first and second tread edges 320, 322 respectively. This forms first and second cavities 342, 344 as explained above. Heat and pressure is then applied causing a uniform flow of the gum layer 334 radially outwardly along the first and second tread edges 320, 322 to the first and second annular radially extending projections 328, 330. In other words, the flow of gum layer 334 fills the first and second cavities 342, 344. In this way, the gum layer 334 forms wings (similar to the wings 348, 350 explained above) to help secure the tread 310 to the casing 314.

Figure 17:
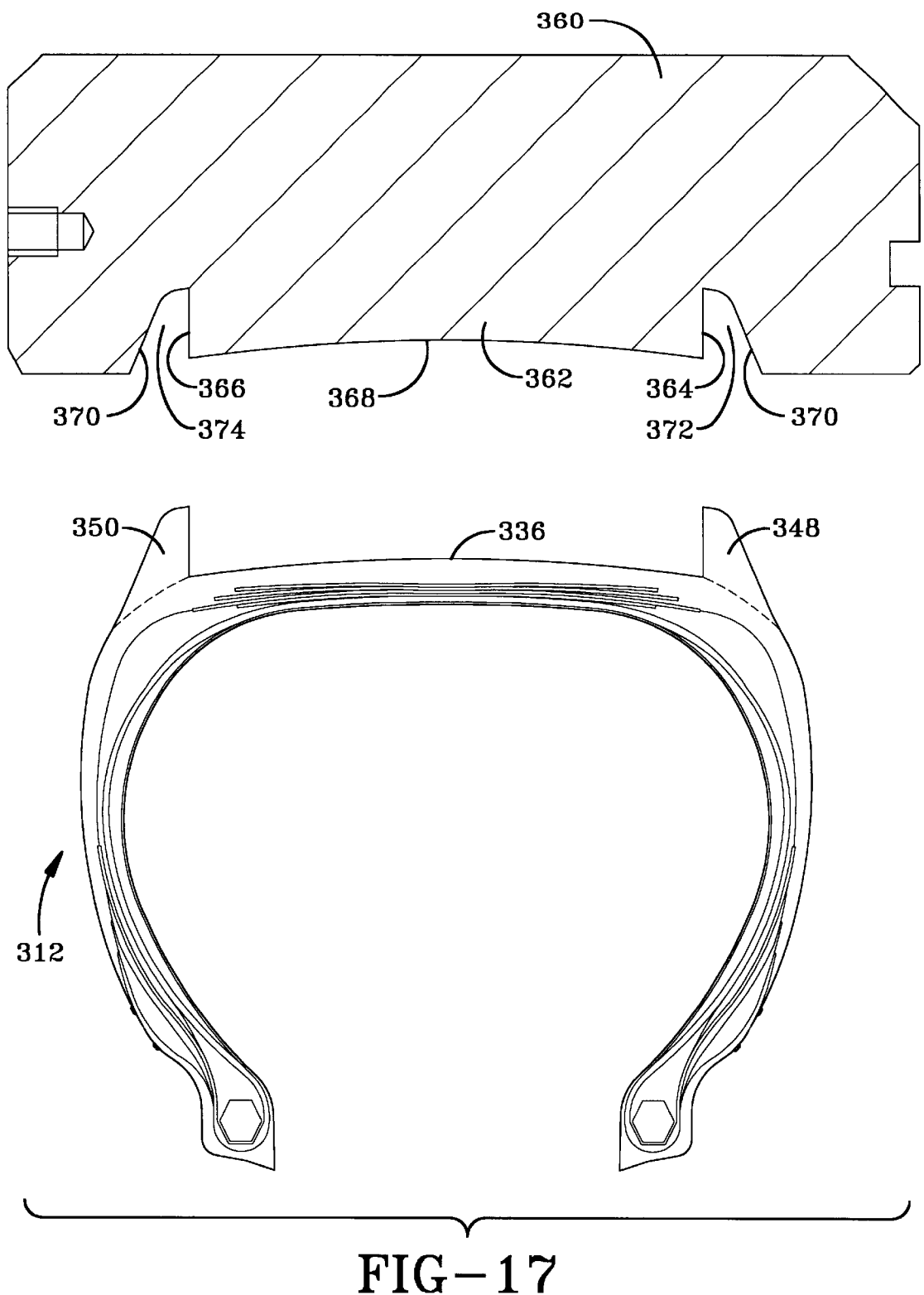
FIG. 17 is cross-sectional view of a mold and casing showing how a mold with a single projection having first and second edges can be used to mold a casing with first and second annular wings.
Figure 18:
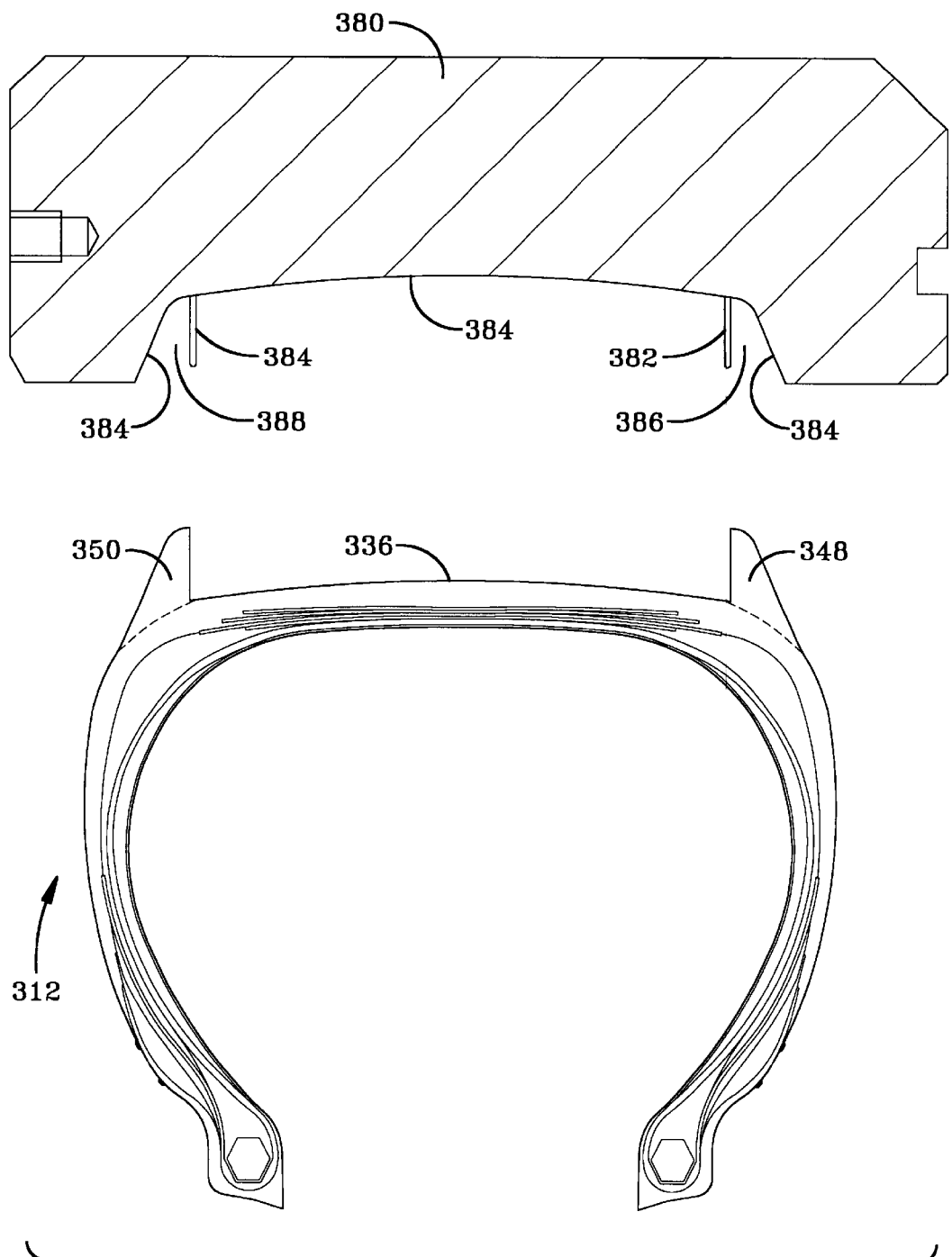
FIG. 18 is a cross-sectional view similar to FIG. 17 but showing how a mold with a first and second projections can be used to mold a casing with first and second annular wings.

With reference now to FIGS. 17–18, it should be noted that it is preferred to mold an unvulcanized casing into a cured casing independent of any tread. In this way precured casings can be made for subsequent attachment to an unvulcanized or precured tread. Two methods for molding an unvulcanized casing into a cured casing will be described. The smooth mold 360 of FIG. 17 has a single projection 362 with first and second edges 364, 366 and a bottom surface 368. The first and second edges 364, 366 in combination with the inner surfaces 370 form first and second annular cavities 372, 374 similar to the first and second annular cavities 342, 344 shown in FIGS. 12 and 14. To mold the unvulcanized casing (this is represented by the casing 312 without the first and second annular wings 348, 350), the tire casing 312 is placed into the mold 360 with the bottom surface 368 contacting an outer surface 336 of the casing. An inflatable bladder (not shown but similar to the bladder 80 shown in FIG. 12) is inserted inside the casing 312. The mold 360 is then closed and the bladder is inflated. This inflation expands and firmly engages the casing 312 with the mold 360. The casing 312 air tightly seals against the bottom surface 368 and inner surfaces 370 of the mold 360. Heat and pressure is then applied causing a uniform flow of casing material radially outwardly along the first and second edges 364, 366 of the projection 362. In other words, the first and second annular cavities 372, 374 are filled with the molten casing material thereby forming the first and second annular wings 348, 350, each wing being the radially outer tread shoulder. These wings 348, 350 can then be used to secure a tread (not shown) in a subsequent or separate operation.

FIG. 18 shows another embodiment whereby an unvulcanized casing can be cured into a cured casing 312 (similar to the casing 312 of FIG. 13) independent of any tread. The smooth mold 360 of FIG. 18 has first and second projections 382, 384 and a bottom surface 384. The first and second projections 382, 384 in combination with the bottom surface 384 form first and second annular cavities 386, 388 similar to the first and second annular cavities 372, 374 shown in FIG. 17. To mold the unvulcanized casing (again represented by the casing 312 without the first and second annular wings 348, 350), the tire casing 312 is placed into the mold 380 with the tips of the first and second projections 382, 384 and the outer edges of the bottom surface 384 contacting an outer surface 336 of the casing. An inflatable bladder (not shown but similar to the bladder 80 shown in FIG. 12) is inserted inside the casing 312. The mold 380 is then closed and the bladder is inflated. This inflation expands and firmly engages the casing 312 with the mold 380. The casing 312 air tightly seals against the first and second projections 382, 384 and the outer edges of the bottom surface 384. Heat and pressure is then applied causing a uniform flow of casing material radially outwardly along the first and second projections 382, 384. In other words, the first and second annular cavities 386, 388 are filled with the molten casing material thereby forming the first and second annular wings 348, 350. These wings 348, 350, as noted above, can then be used to secure a tread (not shown) in a subsequent or separate operation.

With reference again to FIG. 13, a tread 310 (unvulcanized or precured) can be molded to a precured casing 312 as follows. When the tread 310 is unvulcanized, the tread 310 is first placed onto the casing 312 between the first and second annular wings 348, 350. Both the tread 310 and the casing 312 are then placed with in the mold 326. It should be noted that in this case the mold 326 would require tread projections, not shown, for making the required tread grooves. It should also be noted that it is not necessary for the mold 326 to have the first and second projections 328, 330. The mold 326 is then closed and an inflatable bladder (not shown) is inserted inside the casing 312 and inflated. This inflation expands the casing 312 firmly into contact with the tread 310 that correspondingly expands and firmly engages the mold 326 and the first and second annular wings 348, 350 of the casing 312. Heat and pressure is then applied curing the tread 310 to the casing 312.

Figure 19:
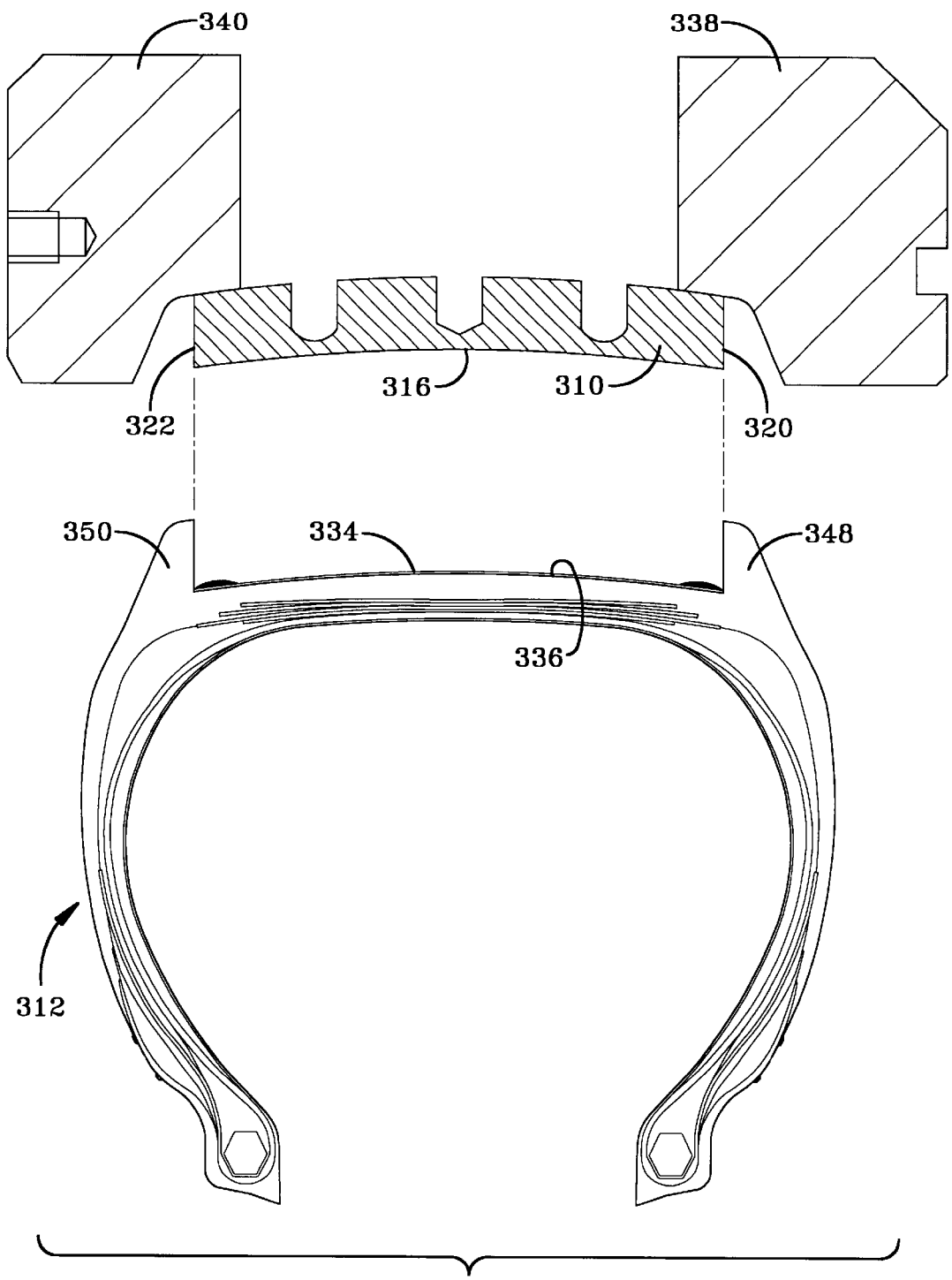
FIG. 19 is a cross-sectional view similar to FIG. 18 but showing how a precured tread can be added to a precured casing having first and second annular wings.

With reference now to FIG. 19, when the tread 310 is precured, a gum layer 334 is added to the outer surface 336 of the casing 312. Preferably, the outer edges of the gum layer 334 are thicker than the center portion as shown. The inner tread surface 316 of the tread 310 and the outer surface 336 of the casing 312 may be buffed prior to the adding of the gum layer 334. The inner tread surface 316 of the tread 310 is then placed onto the gum layer 334 such that the first and second tread edges 320, 322 are juxtaposed to the first and second annular wings 348, 350 of the casing 312. Next, the first and second sealing rings 338, 340 are attached to the tread 310 and casing 312 such that they seal the first and second tread edges 320, 322 to the first and second annular wings 348, 350. Heat and pressure is then applied causing a uniform flow of the gum layer 334 radially outwardly between the first and second tread edges 320, 322 and the first and second annular wings 348, 350. In this way, the gum layer 334 helps to secure the tread 310 to the casing 312.

A great advantage to the current invention will now be further described. A common concern in the tire art relates to the uniformity of tire construction an correspondingly, tire performance. The inventors believe that once cause of poor and/or inconsistent tire performance relates to the non-uniform pressure distribution exerted on tire casings during the tire curing process. Evidence of this phenomenon is found by comparing the performance of carved tires to molded tires. A carved tire is made by first curing tire in a smooth mold thereby forming a tire with a smooth tread. By a smooth tread it is meant that the tread has no grooves or any other such indentations. Next, the smooth tread is carved into the desired tread pattern. When such a carved tire is compared to a molded tire having the same tread pattern but cured in the conventional manner, the performance difference may be substantial. For many important performance parameters, the carved tire may perform better than the molded tire. The inventors believe that a major reason for this performance variation in the molded tire is related to the variation in pressure distribution exerted on the tire casing by the mold due to the various surface interfaces as will be discussed below.

Figure 15:
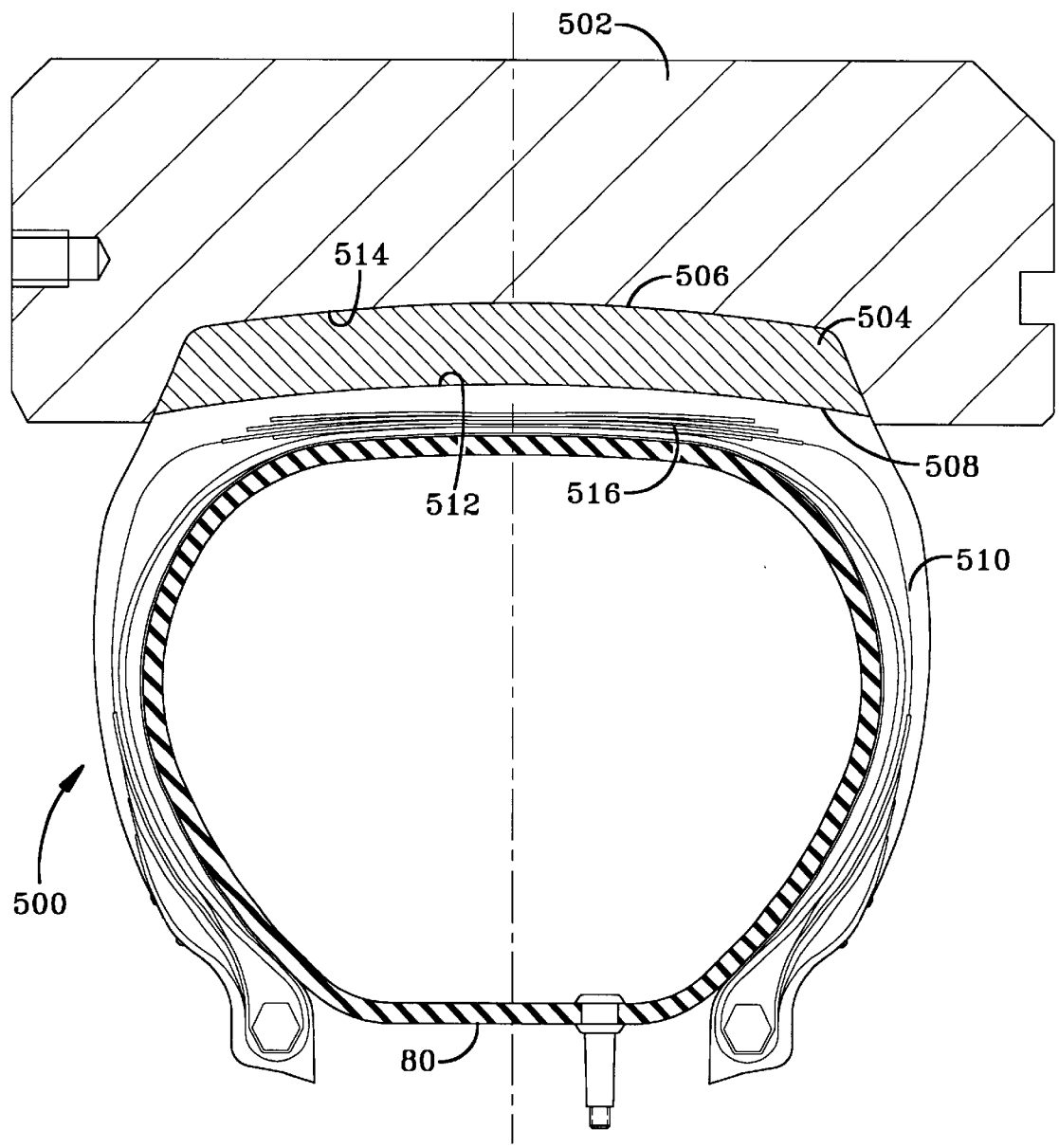
FIG. 15 is a cross-sectional view similar to FIG. 12 showing a smooth tread being cured to a new tire casing in a smooth mold, only the upper portion of the mold being illustrated for simplicity and clarity.

FIG. 15 shows a smooth tire 500 within a smooth mold 502. The smooth tire 500 includes a tread 504 with an outer surface 506 and an inner surface 508 and a casing 510 with an outer surface 512. A belt package 516 is within the casing 510. When the smooth mold 502 is closed, a tread surface 514 of the smooth mold 502 contact the outer surface 506 of the tread 504. Pressure is exerted through the tire 500 so the inner surface 508 of the tread 504 contacts the outer surface 512 of the casing 510. What is to be especially noted is the smoothness of the various surfaces and the correspondingly even pressure distributions across the surface interfaces. In other words, the pressure distribution from the smooth mold 502 onto the tread 504 is even and uniform because the tread surface 514 of the mold 502 and the outer surface 506 of the tread 504 are both smooth. Similarly, the pressure distribution from the inner surface 508 of the tread 504 onto the outer surface 512 of the casing 510 is uniform due to the smooth surfaces 508, 512. This uniform pressure distribution during the curing process provides uniform stresses within the tire and thus components within the casing 510 (such as the belt package 516) maintain a uniform orientation across the width and circumference of the tire 500.

Figure 16:
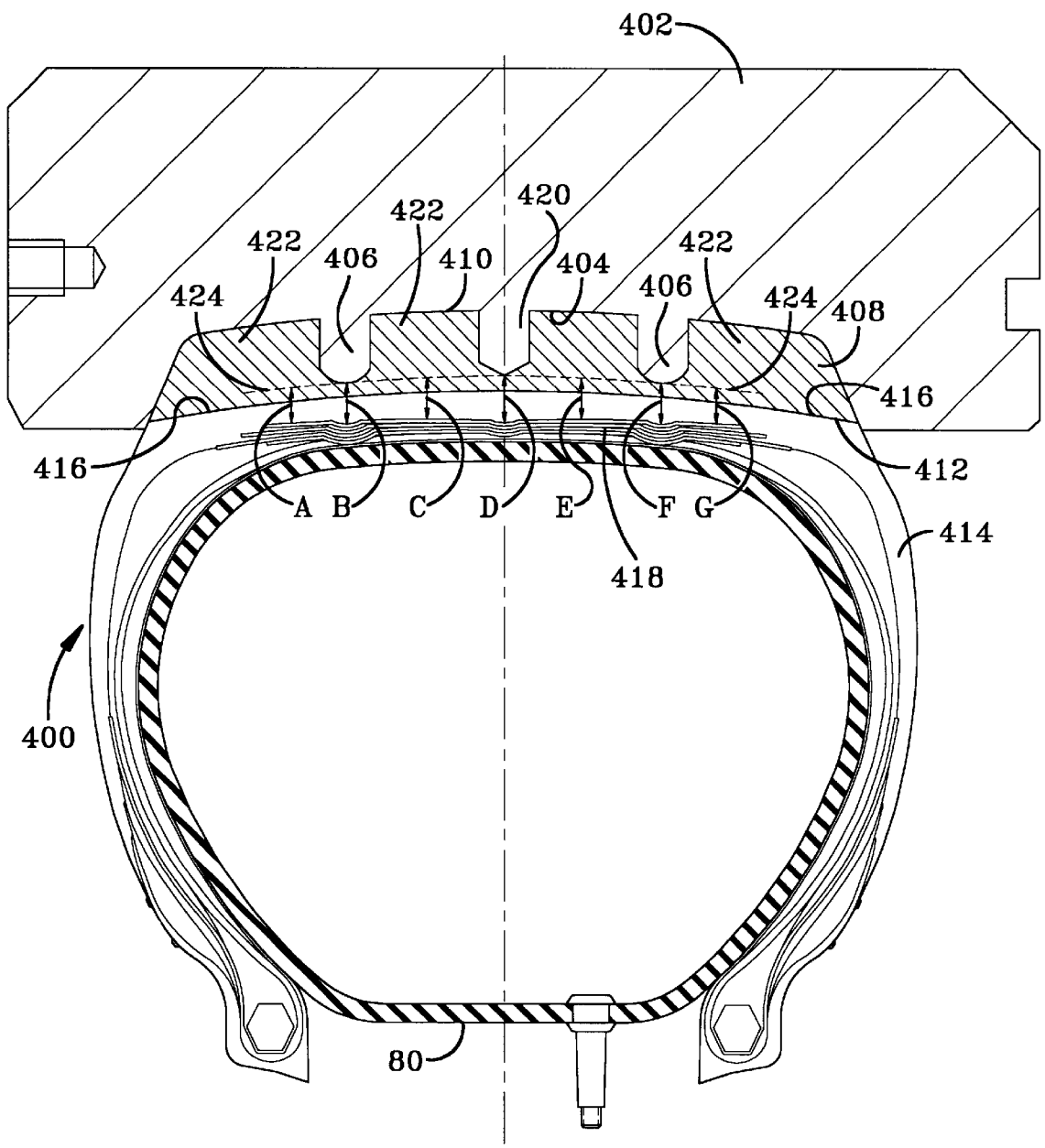
FIG. 16 is a cross-sectional view similar to FIG. 15 showing an unvulcanized tread being molded to an unvulcanized casing in a convectional mold, only the upper portion of the mold being illustrated for simplicity and clarity.

With reference now to FIG. 16, a tire 400 is shown within a conventional mold 402. The mold 402 has a tread surface 404 with projections 406 extending therefrom. The tire 400 includes a tread 408 with an outer surface 410 and an inner surface 412 and a casing 414 within outer surface 416. A belt package 418 is within the casing 414. As the mold 402 is closed, the projections 406 penetrate the tread 408 forming tread grooves 420. When the mold 402 is fully closed the tread surface 404 of the mold 402 comes into contact with the outer surface 410 of the tread 408. As with the smooth tire 500 explained above, pressure is exerted from the mold 402 through the tire 400. However, in this case the pressure distribution is not uniform. For this reason the stresses within the tire are not uniform and thus components within the casing 414 (such as the belt package 418) are distorted. The inventors believe that another important factor in the distortion is that the rubber density of the tread is changed across the width of the tread during curing. Again it is believed that the interaction of the mold with the unvulcanized tread causes this rubber density variation.

This distortion is shown in FIG. 16 where it can be seen that the belt package 418 has a "wavy" orientation across the width of the tire 400. The inventors believe that this distortion is caused by the non-uniform pressure exerted by the mold. FIG. 16 shows that the belt distortion is found primarily beneath the mold projections 406. The belt distortion can be observed by noting the variation in the distance between the bottom of the tread grooves 420 (indicated by curve 424) and the top of the belt package 418 across the width of the tire. This distance is shown with reference to seven locations across the width of the tire as distances A, B, C, D, E, F and G. As shown, the distances at locations B, D and F are directly under the tread grooves 420 whereas the distances at the other locations A, C, E and G are under the tread lugs 422. When tires are cured using conventional means, it is common that the distances at locations B, D and F are greater than at the locations A, C, E and G.

Figure 20:
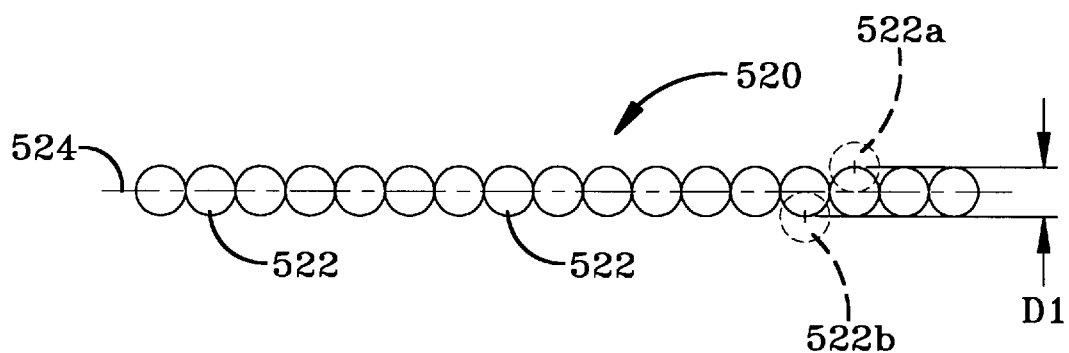
FIG. 20 illustrates a belt having belt cords oriented along a linear belt line and showing a belt cord distortion distance D1.
Figure 21:
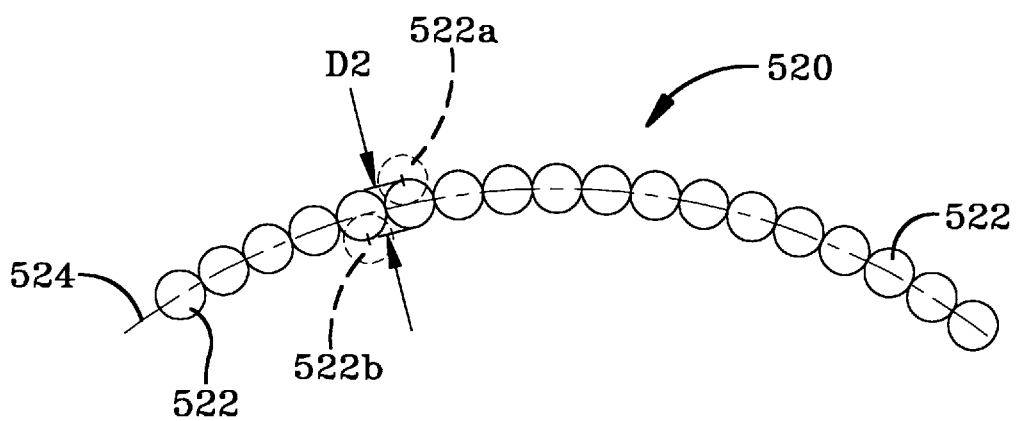
FIG. 21 is a view similar to FIG. 20 illustrating a belt having belt cords oriented along a curvilinear belt line and showing a belt cord distortion distance D2.

With reference now to FIGS. 20–21, this belt distortion can be quantified by recognizing that a belt package typically includes belts formed of a plurality of belt cords. FIG. 20 illustrates a belt 520 formed of multiple belt cords 522. A belt line 524 represents the desired orientation of the belt 520. The desired orientation, and thus the belt line, may be substantially linear, as shown in FIG. 20 or it may have a curvilinear orientation as shown in FIG. 21. In either case it is desired that the individual belt cords 522 be arranged on the belt line 524. Belt distortion can be measured by comparing the centerline distance between two adjacent belt cords 522 as compared to the belt line 524. The belt cords 522 shown in FIGS. 20 and 21 are shown without distortion. However, belt cords 522a and 522b (shown in dashed lines) illustrate possible positions of adjacent belt cords when the belt is distorted. The adjacent belt cords 522a, 522b in FIG. 20 are separated a belt cord distortion distance D1, whereas the adjacent belt cords 522a, 522b in FIG. 21 are separated a belt cord distortion distance D2. Though the actual amount of this belt cord distortion may vary, it is known to have a belt cord distortion (D1 or D2) that is greater than 0.10 inches. All such distortions are believed to contribute to poor and/or inconsistent tire performance. To reduce or eliminate such distortions, it is necessary to reduce or eliminate the non-uniform pressure exerted by the mold onto the tire.

With reference now to FIG. 12, the present invention overcomes this distortion problem by providing uniform pressure distribution on the unvulcanized casing 312 during curing. Since the tread 310 is precured, the smooth mold 326 can be used during curing. When the smooth mold 326 is closed, the inner surface 346 of the smooth mold 326 contacts the outer surface 318 of the tread 310. Pressure is thus exerted from the mold 326 through the tire 300 including components within the casing 312 (such as a belt package 352). What is to be especially noted is that this pressure is exerted uniformly since the tread grooves 324 were formed prior to this curing step. This is similar to the curing of the smooth tire 500 disclosed above. Thus the belt package 352 maintains a generally uniform orientation across the width and circumference of the tire 300. In particular, the distances at locations B, D and F are equal or nearly equal to the distances at the locations A, C, E and G. Quantifying this reduced belt distortion, with reference to FIGS. 20–21, the current invention reduces belt cord distortion (D1 or D2) to less than 0.050 inches, preferably less than 0.025 inches an most preferably to 0.0 inches. In this way, tire uniformity is improved and tire performance is enhanced.

It should also be noted that this reduction in distortions due to uniform pressure distribution also extends the retreadability of tires. Typically, a tire casing that is to have a new tread applied is first buffed to provide the required rubber thickness above the belt package. For tires cured in the conventional manner the distortions described above limit the buffing that a casing may receive. This is true because the wavy orientation of the belt package creates belt high points (such as at locations A, C, E and G in FIG. 16) and low points (such as at locations B, D and F in FIG. 16). The high points limit the amount of rubber that can be buffed without contacting the belt package. Thus, excess rubber is maintained on the casing at the belt low points. This excess rubber reduces the life of the casing. The present invention, however, minimizes or at least greatly reduces the high and low points in the belt package thereby permitting full buffing and eliminating excess rubber on the casing. This extends casing life and provides for additional retreading to the same casing.

With reference now to FIGS. 10–10A, it is well known for the tire casing 100 to be formed of several different components. These components may include an apex 130 a bead core 120 and a sidewall 110 as previously discussed. Another common tire casing component is an inner liner 600. An inner liner 600, as is well known in the art, is the innermost component of the tire casing 100 and generally serves the purpose of maintaining an airtight seal between the inflation air added to pneumatic tires and the tire casing. Prior to this discussion, the applicant in this specification has considered the inner liner 600, if used at all, to be of the same state regarding vulcanization as the rest of the tire casing 100. In other words, when the tire casing 100 has been considered unvulcanized, it was assumed that the inner liner 600 was also unvulcanized and when the tire casing 100 has been considered precured, it was assumed that the inner liner 600 was also precured. An alternate use of a precured inner liner 600 will now be disclosed With continuing reference to FIGS. 10–10A, the applicant's have discovered a manufacturing advantage to forming and curing the inner liner 600 separate from the other tire casing 100 components. This precured inner liner 600 forms a seamless, airtight protective layer for the tire casing 100. The precured inner liner 600 may be injection molded and may be formed of any material chosen with sound engineering judgment. A significant tire assembly advantage is provided by the precured inner liner 600 in that the use of an inflatable bladder 80 (shown, for example, in FIG. 12) is made unnecessary. This greatly simplifies the method of molding a tire and therefore reduce the manufacturing equipment required. In short, the methods disclosed above can be achieved without the use of a bladder. Instead, the tire casing 100 itself (including the precured inner liner 600) can be inflated thereby expanding the casing 100 against the tread. This method can be used with both precure and unvulcanized treads and/or casings.

While the invention has been described in connection with specific embodiments and applications, no intention to restrict the invention to the examples shown is contemplated. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of molding an unvulcanized casing, the unvulcanized casing having a ply and a belt package including belts formed of a plurality of belt cords, the belts having a belt line representing the desired orientation of the belt cords, the method comprising the steps of:

inserting an inflatable bladder or liner inside the casing;

placing the casing in a smooth mold having a single projection with a bottom surface contacting the outer surface of the casing and first and second edges which in combination with inner surfaces of the mold form first and second annular cavities for forming first and second annular wings into the casing each wing being the radially outer tread shoulder;

closing the mold;

inflating the bladder or liner thereby expanding the casing firmly into contact with the smooth mold and air tightly sealing the casing against the projection; and applying the heat and pressure to the mold to vulcanize the casing causing a uniform flow of casing material radially outwardly along the first and second edges of the projection thereby forming first and second annular casing wings, and wherein the adjacent belt cords radially between the first and second annular casing wings have a belt cord distortion as measured from the desired belt line of less than 0.050 inches in the cured casing.

2. The method of claim 1 wherein the step of applying heat and pressure to the mold comprises the step of:

causing a uniform pressure distribution throughout the casing, wherein the distortion as measured from the desired belt line is less than 0.025 inches.

\* \* \* \* \*